United States Patent
Ramanasankaran et al.

(10) Patent No.: US 12,541,182 B2
(45) Date of Patent: Feb. 3, 2026

(54) BUILDING DATA PLATFORM WITH ANALYTICS DEVELOPMENT

(71) Applicant: Tyco Fire & Security GmbH, Neuhausen am Rheinfall (CH)

(72) Inventors: Rajiv Ramanasankaran, San Jose, CA (US); Ambuj Shatdal, Madison, WI (US); Michael James Risbeck, Madison, WI (US); Chenlu Zhang, Milwaukee, WI (US); Krishnamurthy Selvaraj, Milwaukee, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 440 days.

(21) Appl. No.: 18/085,375

(22) Filed: Dec. 20, 2022

(65) Prior Publication Data

US 2023/0205158 A1 Jun. 29, 2023

Related U.S. Application Data

(60) Provisional application No. 63/292,374, filed on Dec. 21, 2021.

(51) Int. Cl.
*G05B 19/042* (2006.01)
*G06F 16/901* (2019.01)
(Continued)

(52) U.S. Cl.
CPC ....... *G05B 19/042* (2013.01); *G06F 16/9024* (2019.01); *G06F 16/90335* (2019.01); *G06N 20/00* (2019.01); *G05B 2219/25011* (2013.01)

(58) Field of Classification Search
CPC ........ G05B 19/042; G05B 2219/25011; G06F 16/90335; G06F 16/9024; G06N 20/00
See application file for complete search history.

(56) References Cited

U.S. PATENT DOCUMENTS 5,301,109 A 4/1994 Landauer et al.
5,446,677 A 8/1995 Jensen et al.
(Continued)

FOREIGN PATENT DOCUMENTS

AU 2019226217 A1 11/2020
AU 2019226264 A1 11/2020
(Continued)

OTHER PUBLICATIONS

U.S. Appl. No. 17/566,029, Passivelogic, Inc.
(Continued)

*Primary Examiner* — Gary Collins
(74) *Attorney, Agent, or Firm* — Foley & Lardner LLP

(57) ABSTRACT

A building system can operate to receive an indication from a user device of a user to query a digital twin of one or more buildings, the digital twin including entities including buildings, equipment, spaces, or data of the one or more buildings, the equipment, or the spaces, the digital twin including relationships between the entities. The building system can operate to receive building data from the digital twin by querying the digital twin based on the indication received from the user device. The building system can operate to generate an analytics model based on the building data, wherein the analytics model is trained based on the building data and deploy the analytics model to operate based on data of the one or more buildings and generate one or more analytic results based on the data of the one or more buildings.

20 Claims, 13 Drawing Sheets

(51) Int. Cl.
  *G06F 16/903* (2019.01)
  *G06N 20/00* (2019.01)

(56) References Cited

U.S. PATENT DOCUMENTS

| | | |
|---|---|---|
| 5,581,478 A | 12/1996 | Cruse et al. |
| 5,812,962 A | 9/1998 | Kovac |
| 5,960,381 A | 9/1999 | Singers et al. |
| 5,973,662 A | 10/1999 | Singers et al. |
| 6,014,612 A | 1/2000 | Larson et al. |
| 6,031,547 A | 2/2000 | Kennedy |
| 6,134,511 A | 10/2000 | Subbarao |
| 6,157,943 A | 12/2000 | Meyer |
| 6,285,966 B1 | 9/2001 | Brown et al. |
| 6,363,422 B1 | 3/2002 | Hunter et al. |
| 6,385,510 B1 | 5/2002 | Hoog et al. |
| 6,389,331 B1 | 5/2002 | Jensen et al. |
| 6,401,027 B1 | 6/2002 | Xu et al. |
| 6,437,691 B1 | 8/2002 | Sandelman et al. |
| 6,477,518 B1 | 11/2002 | Li et al. |
| 6,487,457 B1 | 11/2002 | Hull et al. |
| 6,493,755 B1 | 12/2002 | Hansen et al. |
| 6,577,323 B1 | 6/2003 | Jamieson et al. |
| 6,626,366 B2 | 9/2003 | Kayahara et al. |
| 6,646,660 B1 | 11/2003 | Patty |
| 6,704,016 B1 | 3/2004 | Oliver et al. |
| 6,732,540 B2 | 5/2004 | Sugihara et al. |
| 6,764,019 B1 | 7/2004 | Kayahara et al. |
| 6,782,385 B2 | 8/2004 | Natsumeda et al. |
| 6,813,532 B2 | 11/2004 | Eryurek et al. |
| 6,816,811 B2 | 11/2004 | Seem |
| 6,823,680 B2 | 11/2004 | Jayanth |
| 6,826,454 B2 | 11/2004 | Sulfstede |
| 6,865,511 B2 | 3/2005 | Frerichs et al. |
| 6,925,338 B2 | 8/2005 | Eryurek et al. |
| 6,986,138 B1 | 1/2006 | Sakaguchi et al. |
| 7,031,880 B1 | 4/2006 | Seem et al. |
| 7,401,057 B2 | 7/2008 | Eder |
| 7,552,467 B2 | 6/2009 | Lindsay |
| 7,627,544 B2 | 12/2009 | Chkodrov et al. |
| 7,818,249 B2 | 10/2010 | Lovejoy et al. |
| 7,889,051 B1 | 2/2011 | Billig et al. |
| 7,996,488 B1 | 8/2011 | Casabella et al. |
| 8,078,330 B2 | 12/2011 | Brickfield et al. |
| 8,104,044 B1 | 1/2012 | Scofield et al. |
| 8,229,470 B1 | 7/2012 | Ranjan et al. |
| 8,401,991 B2 | 3/2013 | Wu et al. |
| 8,495,745 B1 | 7/2013 | Schrecker et al. |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,635,182 B2 | 1/2014 | Mackay |
| 8,682,921 B2 | 3/2014 | Park et al. |
| 8,731,724 B2 | 5/2014 | Drees et al. |
| 8,737,334 B2 | 5/2014 | Ahn et al. |
| 8,738,334 B2 | 5/2014 | Jiang et al. |
| 8,751,487 B2 | 6/2014 | Byrne et al. |
| 8,788,097 B2 | 7/2014 | Drees et al. |
| 8,805,995 B1 | 8/2014 | Oliver |
| 8,843,238 B2 | 9/2014 | Wenzel et al. |
| 8,874,071 B2 | 10/2014 | Sherman et al. |
| 8,941,465 B2 | 1/2015 | Pineau et al. |
| 8,990,127 B2 | 3/2015 | Taylor |
| 9,070,113 B2 | 6/2015 | Shafiee et al. |
| 9,116,978 B2 | 8/2015 | Park et al. |
| 9,185,095 B1 | 11/2015 | Moritz et al. |
| 9,189,527 B2 | 11/2015 | Park et al. |
| 9,196,009 B2 | 11/2015 | Drees et al. |
| 9,229,966 B2 | 1/2016 | Aymeloglu et al. |
| 9,286,582 B2 | 3/2016 | Drees et al. |
| 9,311,807 B2 | 4/2016 | Schultz et al. |
| 9,344,751 B1 | 5/2016 | Ream et al. |
| 9,354,968 B2 | 5/2016 | Wenzel et al. |
| 9,507,686 B2 | 11/2016 | Horn et al. |
| 9,524,594 B2 | 12/2016 | Ouyang et al. |
| 9,558,196 B2 | 1/2017 | Johnston et al. |
| 9,652,813 B2 | 5/2017 | Gifford et al. |
| 9,753,455 B2 | 9/2017 | Drees |
| 9,811,249 B2 | 11/2017 | Chen et al. |
| 9,838,844 B2 | 12/2017 | Emeis et al. |
| 9,886,478 B2 | 2/2018 | Mukherjee |
| 9,948,359 B2 | 4/2018 | Horton |
| 10,055,114 B2 | 8/2018 | Shah et al. |
| 10,055,206 B2 | 8/2018 | Park et al. |
| 10,116,461 B2 | 10/2018 | Fairweather et al. |
| 10,169,454 B2 | 1/2019 | Ait-Mokhtar et al. |
| 10,171,297 B2 | 1/2019 | Stewart et al. |
| 10,171,586 B2 | 1/2019 | Shaashua et al. |
| 10,187,258 B2 | 1/2019 | Nagesh et al. |
| 10,514,963 B2 | 12/2019 | Shrivastava et al. |
| 10,515,098 B2 | 12/2019 | Park et al. |
| 10,534,326 B2 | 1/2020 | Sridharan et al. |
| 10,536,295 B2 | 1/2020 | Fairweather et al. |
| 10,564,993 B2 | 2/2020 | Deutsch et al. |
| 10,705,492 B2 | 7/2020 | Harvey |
| 10,708,078 B2 | 7/2020 | Harvey |
| 10,760,815 B2 | 9/2020 | Janakiraman et al. |
| 10,762,475 B2 | 9/2020 | Song et al. |
| 10,824,120 B2 | 11/2020 | Ahmed |
| 10,845,771 B2 | 11/2020 | Harvey |
| 10,854,194 B2 | 12/2020 | Park et al. |
| 10,862,928 B1 | 12/2020 | Badawy et al. |
| 10,921,760 B2 | 2/2021 | Harvey |
| 10,921,972 B2 | 2/2021 | Park et al. |
| 10,969,133 B2 | 4/2021 | Harvey |
| 10,986,121 B2 | 4/2021 | Stockdale et al. |
| 11,016,998 B2 | 5/2021 | Park et al. |
| 11,024,292 B2 | 6/2021 | Park et al. |
| 11,038,709 B2 | 6/2021 | Park et al. |
| 11,041,650 B2 | 6/2021 | Li et al. |
| 11,054,796 B2 | 7/2021 | Holaso |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,229,138 B1 | 1/2022 | Harvey et al. |
| 11,314,726 B2 | 4/2022 | Park et al. |
| 11,314,788 B2 | 4/2022 | Park et al. |
| 11,556,105 B2 | 1/2023 | Cooley et al. |
| 11,561,522 B2 | 1/2023 | Cooley et al. |
| 11,561,523 B2 | 1/2023 | Cooley et al. |
| 11,573,551 B2 | 2/2023 | Cooley et al. |
| 11,586,167 B2 | 2/2023 | Cooley et al. |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |
| 2002/0177909 A1 | 11/2002 | Fu et al. |
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0158704 A1 | 8/2003 | Triginai et al. |
| 2003/0171851 A1 | 9/2003 | Brickfield et al. |
| 2003/0200059 A1 | 10/2003 | Ignatowski et al. |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0278703 A1 | 12/2005 | Lo et al. |
| 2005/0283337 A1 | 12/2005 | Sayal |
| 2006/0095521 A1 | 5/2006 | Patinkin |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0203693 A1 | 8/2007 | Estes |
| 2007/0261062 A1 | 11/2007 | Bansal et al. |

(56) References Cited

U.S. PATENT DOCUMENTS

| | | |
|---|---|---|
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0186160 A1 | 8/2008 | Kim et al. |
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2009/0195349 A1 | 8/2009 | Frader-Thompson et al. |
| 2010/0045439 A1 | 2/2010 | Tak et al. |
| 2010/0058248 A1 | 3/2010 | Park |
| 2010/0131533 A1 | 5/2010 | Ortiz |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1 | 1/2012 | Mackay |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2013/0338970 A1 | 12/2013 | Reghetti |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0207282 A1 | 7/2014 | Angle et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0316918 A1 | 11/2015 | Schleiss et al. |
| 2015/0324422 A1 | 11/2015 | Elder |
| 2015/0341212 A1 | 11/2015 | Hsiao et al. |
| 2015/0348417 A1 | 12/2015 | Ignaczak et al. |
| 2015/0379080 A1 | 12/2015 | Jochimski |
| 2016/0011753 A1 | 1/2016 | Mcfarland et al. |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0247129 A1 | 8/2016 | Song et al. |
| 2016/0260063 A1 | 9/2016 | Harris et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0350364 A1 | 12/2016 | Anicic et al. |
| 2016/0357521 A1 | 12/2016 | Zhang et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |

(56) References Cited

U.S. PATENT DOCUMENTS

| | | |
|---|---|---|
| 2017/0103327 A1 | 4/2017 | Penilla et al. |
| 2017/0103403 A1 | 4/2017 | Chu et al. |
| 2017/0123389 A1 | 5/2017 | Baez et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | Macmillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gärtner et al. |
| 2018/0048485 A1 | 2/2018 | Pelton et al. |
| 2018/0069932 A1 | 3/2018 | Tiwari et al. |
| 2018/0114140 A1 | 4/2018 | Chen et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0336785 A1 | 11/2018 | Ghannam et al. |
| 2018/0356775 A1 | 12/2018 | Harvey |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0037135 A1 | 1/2019 | Hedge |
| 2019/0042988 A1 | 2/2019 | Brown et al. |
| 2019/0088106 A1 | 3/2019 | Grundstrom |
| 2019/0094824 A1 | 3/2019 | Xie et al. |
| 2019/0096217 A1 | 3/2019 | Pourmohammad et al. |
| 2019/0102840 A1 | 4/2019 | Perl et al. |
| 2019/0121801 A1 | 4/2019 | Jethwa et al. |
| 2019/0138512 A1 | 5/2019 | Pourmohammad et al. |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0163215 A1* | 5/2019 | Cheng .................. G05B 15/02 |
| 2019/0268178 A1 | 8/2019 | Fairweather et al. |
| 2019/0310979 A1 | 10/2019 | Masuzaki et al. |
| 2019/0377306 A1 | 12/2019 | Harvey |
| 2020/0167066 A1* | 5/2020 | Park .................... G05B 15/02 |
| 2020/0226156 A1 | 7/2020 | Borra et al. |
| 2020/0285203 A1 | 9/2020 | Thakur et al. |
| 2020/0285788 A1* | 9/2020 | Brebner ............. G06F 18/251 |
| 2020/0326684 A1* | 10/2020 | Chand ................ G05B 23/024 |
| 2020/0336328 A1 | 10/2020 | Harvey |
| 2020/0348632 A1 | 11/2020 | Harvey |
| 2020/0387576 A1 | 12/2020 | Brett et al. |
| 2020/0396208 A1 | 12/2020 | Brett et al. |
| 2021/0042299 A1 | 2/2021 | Migliori |
| 2021/0043221 A1 | 2/2021 | Yelchuru et al. |
| 2021/0325070 A1 | 10/2021 | Endel et al. |
| 2021/0342961 A1 | 11/2021 | Winter et al. |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0121965 A1 | 4/2022 | Chatterji et al. |
| 2022/0138684 A1 | 5/2022 | Harvey |
| 2022/0147000 A1 | 5/2022 | Cooley et al. |
| 2022/0150124 A1 | 5/2022 | Cooley et al. |
| 2022/0215264 A1 | 7/2022 | Harvey et al. |
| 2023/0010757 A1 | 1/2023 | Preciado |
| 2023/0071312 A1 | 3/2023 | Preciado et al. |
| 2023/0076011 A1 | 3/2023 | Preciado et al. |
| 2023/0083703 A1 | 3/2023 | Meiners |

FOREIGN PATENT DOCUMENTS

| | | |
|---|---|---|
| CN | 101415011 A | 4/2009 |
| CN | 102136099 A | 7/2011 |
| CN | 102136100 A | 7/2011 |
| CN | 102650876 A | 8/2012 |
| CN | 104040583 A | 9/2014 |
| CN | 104603832 A | 5/2015 |
| CN | 104919484 A | 9/2015 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| EP | 2 528 033 A1 | 11/2012 |
| EP | 3 268 821 B1 | 1/2018 |
| EP | 3 324 306 A1 | 5/2018 |
| EP | 4 226 263 A1 | 8/2023 |
| JP | H10-049552 A | 2/1998 |
| JP | 2003-162573 A | 6/2003 |
| JP | 2007-018322 A | 1/2007 |
| JP | 4073946 B1 | 4/2008 |
| JP | 2008-107930 A | 5/2008 |
| JP | 2013-152618 A | 8/2013 |
| JP | 2014-044457 A | 3/2014 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |
| WO | WO-2018/132112 A1 | 7/2018 |
| WO | WO-2020/061621 A1 | 4/2020 |
| WO | WO-2022/042925 A1 | 3/2022 |
| WO | WO-2022/103812 A1 | 5/2022 |
| WO | WO-2022/103813 A1 | 5/2022 |
| WO | WO-2022/103820 A1 | 5/2022 |

(56) References Cited

FOREIGN PATENT DOCUMENTS

| WO | WO-2022/103822 A1 | 5/2022 |
|---|---|---|
| WO | WO-2022/103824 A1 | 5/2022 |
| WO | WO-2022/103829 A1 | 5/2022 |
| WO | WO-2022/103831 A1 | 5/2022 |

OTHER PUBLICATIONS

U.S. Appl. No. 17/567,275, Passivelogic, Inc.
U.S. Appl. No. 17/722,115, Passivelogic, Inc.
U.S. Appl. No. 17/529,118, filed Nov. 17, 2021.
U.S. Appl. No. 17/529,120, filed Nov. 17, 2021, Johnson Controls Tyco IP Holdings LLP.
U.S. Appl. No. 17/537,046, filed Nov. 29, 2021, Johnson Controls Tyco IP Holdings LLP.
Balaji et al, "Brick: Metadata schema for portable smart building applications," Applied Energy, 2018 (20 pages).
Balaji et al, "Brick: Metadata schema for portable smart building applications," Applied Energy, Sep. 15, 2018, 3 pages, (Abstract).
Balaji et al, "Demo Abstract: Portable Queries Using the Brick Schema for Building Applications," BuildSys '16, Palo Alto, CA, USA, Nov. 16-17, 2016 (2 pages).
Balaji, B. et al., "Brick: Towards a Unified Metadata Schema for Buildings." BuildSys '16, Palo Alto, CA, USA, Nov. 16-17, 2016 (10 pages).
Bhattacharya et al., "Short Paper: Analyzing Metadata Schemas for Buildings—The Good, The Bad and The Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema For Buildings," URL: chrome-extension://efaidnbmnnnibpcajpcglclefindmkaj/https://brickschema.org/papers/Brick_BuildSys_Presen tation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. No. 201780003995.9 dated Apr. 8, 2021 (21 pages with English language translation).
Chinese Office action on CN Appl. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2-23-Oct. 20, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 22) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Extended European Search Report on EP Application No. 18196948.6 dated Apr. 10, 2019 (9 pages).
Fierro et al., "Beyond a House of Sticks: Formalizing Metadata Tags with Brick, " BuildSys '19, New York, NY, USA, Nov. 13-14, 2019 (10 pages).
Fierro et al., "Dataset: An Open Dataset and Collection Tool for BMS Point Labels," DATA'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jue 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, mailed Oct. 5, 2017, 11 pages.
International Search Report and Written Opinion on PCT/US2017/052633, mailed Oct. 23, 2017, 9 pages.

(56) References Cited

OTHER PUBLICATIONS

International Search Report and Written Opinion on PCT/US2017/052829, mailed Nov. 27, 2017, 24 pages.
International Search Report and Written Opinion on PCT/US2018/024068, mailed Jun. 15, 2018, 22 pages.
International Search Report and Written Opinion on PCT/US2018/052971, dated Mar. 1, 2019, 19 pages.
International Search Report and Written Opinion on PCT/US2018/052974, mailed Dec. 19, 2018, 13 pages.
International Search Report and Written Opinion on PCT/US2018/052975, mailed Jan. 2, 2019, 13 pages.
International Search Report and Written Opinion on PCT/US2018/052994, mailed Jan. 7, 2019, 15 pages.
International Search Report and Written Opinion on PCT/US2019/015481, dated May 17, 2019, 78 pages.
International Search Report and Written Opinion on PCT/US2020/058381, dated Jan. 27, 2021, 30 pages.
Japanese Office Action on JP Appl. No. 2018-534963 dated May 11, 2021 (16 pages with English language translation).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13- 14, 2019 (4 pages).
Li et al., "Event Stream Processing with Out-of-Order Data Arrival," International Conferences on Distributed Computing Systems, 2007, (8 pages).
Nissin Electric Co., Ltd., "Smart power supply system (SPSS)," Outline of the scale verification plan, Nissin Electric Technical Report, Japan, Apr. 23, 2014, vol. 59, No. 1 (23 pages).
Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Results of the Partial International Search for PCT/US2018/052971, dated Jan. 3, 2019, 3 pages.
Sinha, Sudhi and Al Huraimel, Khaled, "Reimagining Businesses with AI" John Wiley & Sons, Inc., Hoboken, NJ, USA, 2021 (156 pages).
Sinha, Sudhi R. and Park, Youngchoon, "Building an Effective IoT Ecosystem for Your Business," Johnson Controls International, Springer International Publishing, 2017 (286 pages).
Sinha, Sudhi, "Making Big Data Work For Your Business: A guide to effective Big Data analytics," Impackt Publishing Ltd., Birmingham, UK, Oct. 2014 (170 pages).
The Virtual Nuclear Tourist, "Calvert Cliffs Nuclear Power Plant," URL: http://www.nucleartourist.com/us/calvert.htm, Jan. 11, 2006 (2 pages).
University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2022 (7 pages).
Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).
W3c, "SPARQL: Query Language for RDF," located on The Wayback Machine, URL: https://web.archive.org/web/20161230061728/http://www.w3.org/TR/rdf-sparql-query/), retrieved from internet Nov. 15, 2022 (89 pages).
Wei et al., "Development and Implementation of Software Gateways of Fire Fighting Subsystem Running on EBI," Control, Automation and Systems Engineering, IITA International Conference on, IEEE, Jul. 2009 (pp. 9-12).
White et al., "Reduce building maintenance costs with AWS IoT TwinMaker Knowledge Graph," The Internet of Things on AWS—Official Blog, URL: https://aws.amazon.com/blogs/iot/reduce-building-maintenance-costs-with-aws-iot-twinmaker-knowledge-graph/, Nov. 18, 2022 (10 pages).
Zhou, Q. et al., "Knowledge-infused and Consistent Complex Event Processing over Real-time and Persistent Streams," Further Generation Computer Systems, 2017, 76 (pp. 391-406).

\* cited by examiner

BUILDING DATA PLATFORM WITH ANALYTICS DEVELOPMENT

CROSS-REFERENCE TO RELATED PATENT APPLICATION

This application claims the benefit of, and priority to, U.S. Patent Application No. 63/292,374 filed Dec. 21, 2021, the entirety of which is incorporated by reference herein.

BACKGROUND

This application relates generally to building systems of a building that collect data from building systems of a building and operate to control the building based on the collected data and/or generate analytics based on the collected data.

This application relates more particularly to artificial intelligence (AI) and machine learning (ML) techniques for building, training, and implementing AI and/or ML models for the building system. Designing an AI and/or ML model may require a significant amount of development time. For example, a developer may first need to research and compile various data points that are available for generating the AI and/or ML models. Then, the developer may need to spend time generating AI and/or ML models and integrating the generated AI and/or ML models with the platform that compiles and manages the data points for the building.

SUMMARY

One implementation of the present disclosure is a building system of one or more buildings including one or more storage devices storing instructions thereon that, when executed by one or more processors, cause the one or more processors to receive an indication from a user device of a user to query a digital twin of one or more buildings, the digital twin including entities including buildings, equipment, spaces, or data of the buildings, the equipment, or the spaces and relationships between the entities. The instructions cause the one or more processors to receive building data from the digital twin by querying the digital twin based on the indication received from the user device, generate an analytics model based on the building data, wherein the analytics model is trained based on the building data, and deploy the analytics model to operate based on data of the one or more buildings and generate one or more analytic results based on the data of the one or more buildings.

In some embodiments, the instructions cause the one or more processors to identify that a requested data point is not included within the digital twin and perform at least one of identifying a substitute data point of the digital twin that substitutes for the requested data point in response to identifying that the requested data point is not included within the digital twin or simulating the requested data point based on data of the digital twin in response to identifying that the requested data point is not included within the digital twin.

In some embodiments, the analytics model is an artificial intelligence or machine learning model configured to generate an output based on at least a portion of the building data input into the artificial intelligence or machine learning model.

In some embodiments, the instructions cause the one or more processors to store analytic model templates in the one or more storage devices and receive, via the user device, a selection of one analytic model template from the analytic model templates for the analytics model.

In some embodiments, the instructions cause the one or more processors to provide a user interface to the user device, the user interface including a model development environment and receive a design for the analytics model via the user interface.

In some embodiments, the instructions cause the one or more processors to split the building data into a training data set and a testing data set, train the analytics model based on the training data set, and validate the analytics model based on the testing data set.

In some embodiments, the instructions cause the one or more processors to receive a first model configuration and a second model configuration for the analytics model, generate a first analytics model based on the first model configuration and a second analytics model based on the second model configuration, and test the first analytics model and the second analytics model based on at least a portion of the building data and generate a first performance score for the first analytics model and a second performance score for the second analytics model.

In some embodiments, the instructions cause the one or more processors to receive a first hardware or resource selection and a second hardware or resource selection for the analytics model, test the analytics model with the first hardware or resource selection and the analytics model with the second hardware or resource selection, and generate a first performance score for the analytics model for the first hardware or resource selection and a second performance score for the analytics model for the second hardware or resource selection.

In some embodiments, the digital twin includes a building graph including nodes and edges. In some embodiments, the nodes represent the entities and the edges represent the relationships between the entities.

In some embodiments, the instructions cause the one or more processors to receive a graph template via the user device, the graph template defining one or more particular nodes and one or more particular edges connecting the one or more particular nodes and query the building graph based on the graph template, a result of the query identifying one or more data sets of data matching the graph template.

In some embodiments, the instructions cause the one or more processors to display the graph template in a user interface, wherein each node of the one or more particular nodes is included on one level of a hierarchy and cause the user interface to display indications of data of the building graph for each level of the hierarchy, the indications indicating data of the building graph that matches a node of a level of the hierarchy and nodes and edges of one or more higher levels of the hierarchy.

In some embodiments, the data of the building graph includes actual data for the node of the level, substitute data that substitutes for the actual data, or simulated data that is generated to simulate the actual data.

One implementation of the present disclosure is a method. The method includes receiving, by one or more processing circuits, an indication from a user device of a user to query a digital twin of one or more buildings, the digital twin including entities including buildings, equipment, spaces, or data of the one or more buildings, the equipment, or the spaces, the digital twin including relationships between the entities. The method includes receiving, by the one or more processing circuits, building data from the digital twin by querying the digital twin based on the indication received from the user device. The method includes generating an analytics model based on the building data, wherein the analytics model is trained based on the building data. The method includes deploying the analytics model to operate based on data of the one or more buildings and generate one or more analytic results based on the data of the one or more buildings.

In some embodiments, the method can include identifying, by the one or more processing circuits, that a requested data point is not included within the digital twin. In some embodiments, the method can include performing, by the one or more processing circuits, at least one of identifying a substitute data point of the digital twin that substitutes for the requested data point in response to identifying that the requested data point is not included within the digital twin or simulating the requested data point using data of the digital twin in response to identifying that the requested data point is not included within the digital twin.

In some embodiments, the digital twin includes a building graph including nodes and edges. In some embodiments, the nodes represent the entities and the edges represent the relationships between the entities.

In some embodiments, the method includes receiving, by the one or more processing circuits, a graph template via the user device, the graph template defining one or more particular nodes and one or more particular edges connecting the one or more particular nodes. In some embodiments, the method includes querying, by the one or more processing circuits, the building graph based on the graph template, a result of the query identifying one or more data sets of data matching the graph template.

In some embodiments, the method includes displaying, by the one or more processing circuits, the graph template in a user interface, wherein each node of the one or more particular nodes is included on one level of a hierarchy. In some embodiments, the method includes causing, by the one or more processing circuits, the user interface to display indications of data of the building graph for each level of the hierarchy, the indications indicating data of the building graph that matches a node of a level of the hierarchy and nodes and edges of one or more higher levels of the hierarchy.

Another implementation of the present disclosure is one or more storage media storing instructions thereon that, when executed by one or more processors, cause the one or more processors to receive an indication from a user device of a user to query a digital twin of one or more buildings, the digital twin including entities including buildings, equipment, spaces, or data of the one or more buildings, the equipment, or the spaces, the digital twin including relationships between the entities. The instructions cause the one or more processors to receive building data from the digital twin by querying the digital twin based on the indication received from the user device. The instructions cause the one or more processors to generate an analytics model based on the building data, wherein the analytics model is trained based on the building data. The instructions cause the one or more processors to deploy the analytics model to operate based on data of the one or more buildings and generate one or more analytic results based on the data of the one or more buildings.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
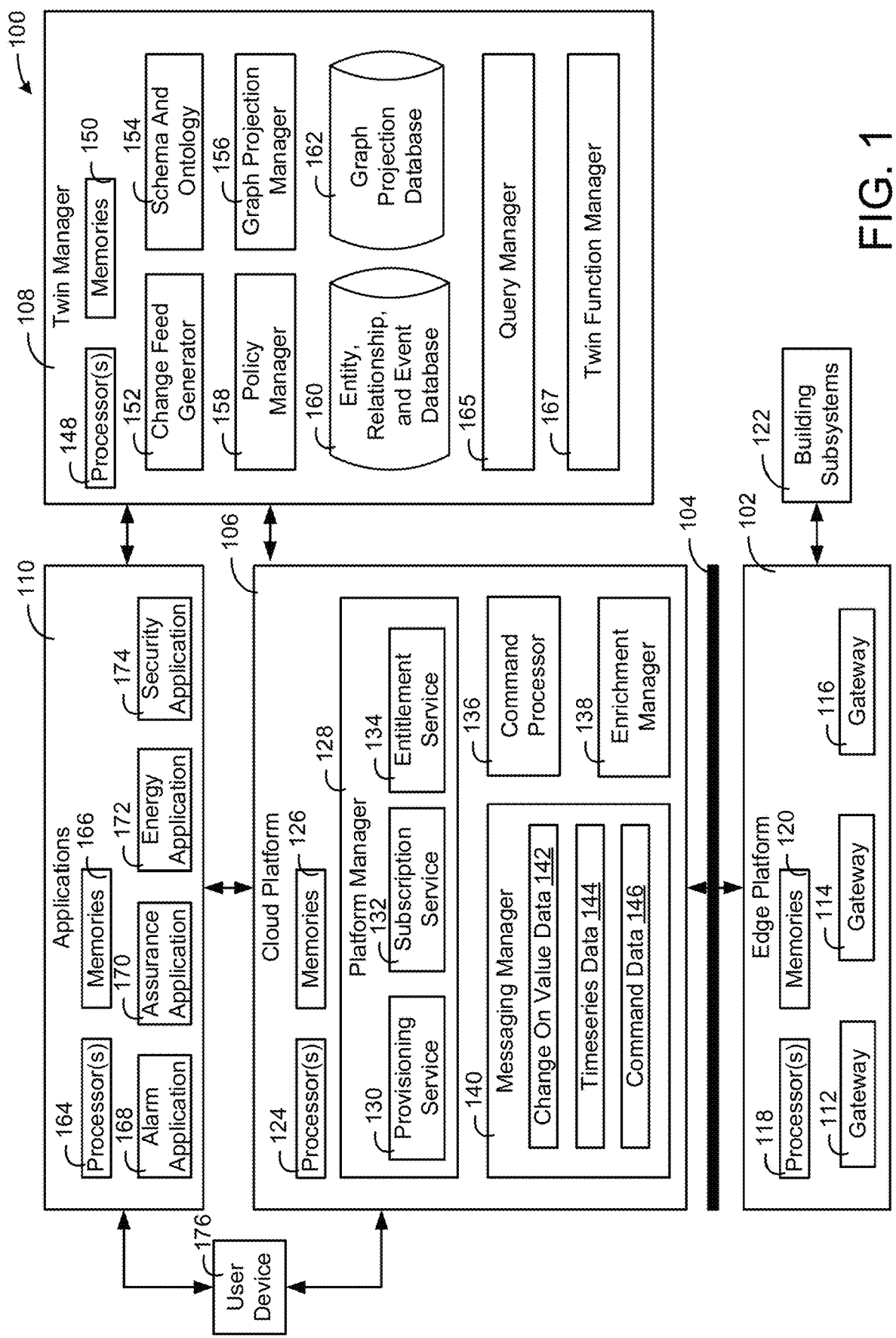
FIG. 1 is a block diagram of a building data platform including an edge platform, a cloud platform, and a twin manager, according to an exemplary embodiment.

Referring generally to the FIGURES, systems and methods are shown for an analytics development platform, according to various exemplary embodiments. A building data platform can include a development platform that enables a user to quickly and efficiently develop AI and/or ML models for the building data platform to operate. The user may, in some cases, be a building manager, a technician, a data scientist, an engineer, a software developer, a building tenant, etc. The development platform can be configured to expose and provide various data points to the user and allow the user to select the data points and/or develop an AI and/or ML model to operate on the data points (e.g., train on the data points, test on the data points, and/or generate inferences on the data points).

Because the building data platform includes the development platform, the building data platform can itself include a playground for developing analytics, e.g., AI and/or ML based models. Because the building data platform includes the development platform, the user can easily and quickly design, develop, and deploy analytics that directly integrate with the development platform. This allows analytics to be developed without requiring an integration of the analytics into the data platform.

The building data platform may include a digital twin (e.g., a knowledge graph, a graph projection, a building graph, etc.). The digital twin can be queried by the building data platform to expose data points that the user is interested in using to build the AI and/or ML model. The knowledge graph can allow for the data points to be easily cataloged, reviewed, and consumed by the analytics platform to allow the user to select and use the data points. The digital twin may be the same as, or similar to, the digital twin discussed in U.S. patent application Ser. No. 17/529,118 filed Nov. 17, 2021, U.S. patent application Ser. No. 17/537,046 filed Nov. 29, 2021, and U.S. patent application Ser. No. 17/529,120 filed Nov. 17, 2021, the entireties of which are incorporated by reference herein.

In some embodiments, the development platform allows the user to define a project for analytics development. The project can be a playground for developing an AI and/or ML model, the playground allowing a user to experiment with data sets, model types, model parameters, training methodologies, etc. The development platform can allow a user to select data sets for use in training the AI and/or ML model, e.g., select equipment and/or data points for the models. In some embodiments, the user can identify source subsystems that they are interested in and the building data platform can provide all data points for the identified source subsystem for review by the user, the data points can be pulled from adjacent building graphs.

The development platform can allow a user to review equipment, data (e.g., events), and/or data points of the building graph by querying the building graph based on various criteria provided by the user. The querying can be handled with SPARQL (e.g., a SPARQL query that fuses, correlates, and/or pre-joins data), LEAP, SNOWLFAKE, etc. The data can be pulled from applications via APIs of the building data platform. Furthermore, the data can be pulled through external integrations with external systems, e.g., Weather Servers, Dataminr, etc.

The user can further define a goal for the project. The goal can indicate the overall purpose of AI and/or ML model to achieve when deployed and executed by the building data platform. The goal could be energy optimization, occupancy predictions, sustainability, occupant comfort, fault detection and diagnostics (FDD), equipment load predictions, etc.

The development platform may allow a user to select and run predefined AI and/or ML models. The predefined AI and/or ML models can enable users to quickly implement model templates with minimal interactions (e.g., one click deployment). The selected model templates can implement inference APIs that can integrate with applications consuming the inferences made by the models. In some embodiments, the development platform may include a coding, scripting, and/or other technical development environment allowing a user to build the AI and/or ML models. In some embodiments, the development platform could include or integrate with Jupyter Notebooks allowing a user to define and/or develop the AI and/or ML models.

Furthermore, the development platform can allow the user to select from different types of CPUs, GPUs, microprocessors, memory devices, etc. for running the models. Furthermore, the development platform can allow the user to select certain amounts of processing resources, memory resources, data storage resources, etc. for allocation to the models. Based on the selections of the user, the development platform can run the AI and/or ML models on the selected computing resources in the building data platform and/or in servers or computers linked to the building data platform. Once the AI and/or ML models are implemented and run, the user can review the performance of the various AI and/or ML models for the various hardware and/or resource allocation selections. The user can train multiple models simultaneously and select one or multiple of the models to be implemented. The models can be saved as templates to allow for the user to iterate the models.

Referring now to FIG. 1, a building data platform 100 including an edge platform 102, a cloud platform 106, and a twin manager 108 are shown, according to an exemplary embodiment. The edge platform 102, the cloud platform 106, and the twin manager 108 can each be separate services deployed on the same or different computing systems. In some embodiments, the cloud platform 106 and the twin manager 108 are implemented in off premises computing systems, e.g., outside a building. The edge platform 102 can be implemented on-premises, e.g., within the building. However, any combination of on-premises and off-premises components of the building data platform 100 can be implemented.

The building data platform 100 includes applications 110. The applications 110 can be various applications that operate to manage the building subsystems 122. The applications 110 can be remote or on-premises applications (or a hybrid of both) that run on various computing systems. The applications 110 can include an alarm application 168 configured to manage alarms for the building subsystems 122. The applications 110 include an assurance application 170 that implements assurance services for the building subsystems 122. In some embodiments, the applications 110 include an energy application 172 configured to manage the energy usage of the building subsystems 122. The applications 110 include a security application 174 configured to manage security systems of the building.

In some embodiments, the applications 110 and/or the cloud platform 106 interacts with a user device 176. In some embodiments, a component or an entire application of the applications 110 runs on the user device 176. The user device 176 may be a laptop computer, a desktop computer, a smartphone, a tablet, and/or any other device with an input interface (e.g., touch screen, mouse, keyboard, etc.) and an output interface (e.g., a speaker, a display, etc.).

The applications 110, the twin manager 108, the cloud platform 106, and the edge platform 102 can be implemented on one or more computing systems, e.g., on processors and/or memory devices. For example, the edge platform 102 includes processor(s) 118 and memories 120, the cloud platform 106 includes processor(s) 124 and memories 126, the applications 110 include processor(s) 164 and memories 166, and the twin manager 108 includes processor(s) 148 and memories 150.

The processors can be a general purpose or specific purpose processors, an application specific integrated circuit (ASIC), one or more field programmable gate arrays (FPGAs), a group of processing components, or other suitable processing components. The processors may be configured to execute computer code and/or instructions stored in the memories or received from other computer readable media (e.g., CDROM, network storage, a remote server, etc.).

The memories can include one or more devices (e.g., memory units, memory devices, storage devices, etc.) for storing data and/or computer code for completing and/or facilitating the various processes described in the present disclosure. The memories can include random access memory (RAM), read-only memory (ROM), hard drive storage, temporary storage, non-volatile memory, flash memory, optical memory, or any other suitable memory for storing software objects and/or computer instructions. The memories can include database components, object code components, script components, or any other type of information structure for supporting the various activities and information structures described in the present disclosure. The memories can be communicably connected to the processors and can include computer code for executing (e.g., by the processors) one or more processes described herein.

The edge platform 102 can be configured to provide connection to the building subsystems 122. The edge platform 102 can receive messages from the building subsystems 122 and/or deliver messages to the building subsystems 122. The edge platform 102 includes one or multiple gateways, e.g., the gateways 112-116. The gateways 112-116 can act as a gateway between the cloud platform 106 and the building subsystems 122. The gateways 112-116 can be the gateways described in U.S. Provisional Patent Application No. 62/951,897 filed Dec. 20, 2019, the entirety of which is incorporated by reference herein. In some embodiments, the applications 110 can be deployed on the edge platform 102. In this regard, lower latency in management of the building subsystems 122 can be realized.

The edge platform 102 can be connected to the cloud platform 106 via a network 104. The network 104 can communicatively couple the devices and systems of building data platform 100. In some embodiments, the network 104 is at least one of and/or a combination of a Wi-Fi network, a wired Ethernet network, a ZigBee network, a Bluetooth network, and/or any other wireless network. The network 104 may be a local area network or a wide area network (e.g., the Internet, a building WAN, etc.) and may use a variety of communications protocols (e.g., BACnet, IP, LON, etc.). The network 104 may include routers, modems, servers, cell towers, satellites, and/or network switches. The network 104 may be a combination of wired and wireless networks.

The cloud platform 106 can be configured to facilitate communication and routing of messages between the applications 110, the twin manager 108, the edge platform 102, and/or any other system. The cloud platform 106 can include a platform manager 128, a messaging manager 140, a command processor 136, and an enrichment manager 138. In some embodiments, the cloud platform 106 can facilitate messaging between the building data platform 100 via the network 104.

The messaging manager 140 can be configured to operate as a transport service that controls communication with the building subsystems 122 and/or any other system, e.g., managing commands to devices (C2D), commands to connectors (C2C) for external systems, commands from the device to the cloud (D2C), and/or notifications. The messaging manager 140 can receive different types of data from the applications 110, the twin manager 108, and/or the edge platform 102. The messaging manager 140 can receive change on value data 142, e.g., data that indicates that a value of a point has changed. The messaging manager 140 can receive timeseries data 144, e.g., a time correlated series of data entries each associated with a particular time stamp. Furthermore, the messaging manager 140 can receive command data 146. All of the messages handled by the cloud platform 106 can be handled as an event, e.g., the data 142-146 can each be packaged as an event with a data value occurring at a particular time (e.g., a temperature measurement made at a particular time).

The cloud platform 106 includes a command processor 136. The command processor 136 can be configured to receive commands to perform an action from the applications 110, the building subsystems 122, the user device 176, etc. The command processor 136 can manage the commands, determine whether the commanding system is authorized to perform the particular commands, and communicate the commands to the commanded system, e.g., the building subsystems 122 and/or the applications 110. The commands could be a command to change an operational setting that control environmental conditions of a building, a command to run analytics, etc.

The cloud platform 106 includes an enrichment manager 138. The enrichment manager 138 can be configured to enrich the events received by the messaging manager 140. The enrichment manager 138 can be configured to add contextual information to the events. The enrichment manager 138 can communicate with the twin manager 108 to retrieve the contextual information. In some embodiments, the contextual information is an indication of information related to the event. For example, if the event is a timeseries temperature measurement of a thermostat, contextual information such as the location of the thermostat (e.g., what room), the equipment controlled by the thermostat (e.g., what VAV), etc. can be added to the event. In this regard, when a consuming application, e.g., one of the applications 110 receives the event, the consuming application can operate based on the data of the event, the temperature measurement, and also the contextual information of the event.

The enrichment manager 138 can solve a problem that when a device produces a significant amount of information, the information may contain simple data without context. An example might include the data generated when a user scans a badge at a badge scanner of the building subsystems 122. This physical event can generate an output event including such information as "DeviceBadgeScannerID," "BadgeID," and/or "Date/Time." However, if a system sends this data to a consuming application, e.g., Consumer A and a Consumer B, each customer may need to call the building data platform knowledge service to query information with queries such as, "What space, build, floor is that badge scanner in?" or "What user is associated with that badge?"

By performing enrichment on the data feed, a system can be able to perform inferences on the data. A result of the enrichment may be transformation of the message "DeviceBadgeScannerId, BadgeId, Date/Time," to "Region, Building, Floor, Asset, DeviceId, BadgeId, UserName, EmployeeId, Date/Time Scanned." This can be a significant optimization, as a system can reduce the number of calls by 1/n, where n is the number of consumers of this data feed.

By using this enrichment, a system can also have the ability to filter out undesired events. If there are 100 building in a campus that receive 100,000 events per building each hour, but only 1 building is actually commissioned, only 1/10 of the events are enriched. By looking at what events are enriched and what events are not enriched, a system can do traffic shaping of forwarding of these events to reduce the cost of forwarding events that no consuming application wants or reads.

An example of an event received by the enrichment manager 138 may be:

{
"id": "someguid",
"eventType": "Device_Heartbeat",
"eventTime": "2018-01-27T00:00:00+00:00"

```
"eventValue": 1,
"deviceID": "someguid"
}
```
An example of an enriched event generated by the enrichment manager 138 may be:
```
{
"id": "someguid",
"eventType": "Device_Heartbeat",
"eventTime": "2018-01-27T00:00:00+00:00"
"eventValue": 1,
"deviceID": "someguid",
"buildingName": "Building-48",
"buildingID": "SomeGuid",
"panelID": "SomeGuid",
"panelName": "Building-48-Panel-13",
"cityID": 371,
"cityName": "Milwaukee",
"stateID": 48,
"stateName": "Wisconsin (WI)",
"countryID": 1,
"countryName": "United States"
}
```

By receiving enriched events, an application of the applications 110 can be able to populate and/or filter what events are associated with what areas. Furthermore, user interface generating applications can generate user interfaces that include the contextual information based on the enriched events.

The cloud platform 106 includes a platform manager 128. The platform manager 128 can be configured to manage the users and/or subscriptions of the cloud platform 106. For example, what subscribing building, user, and/or tenant utilizes the cloud platform 106. The platform manager 128 includes a provisioning service 130 configured to provision the cloud platform 106, the edge platform 102, and the twin manager 108. The platform manager 128 includes a subscription service 132 configured to manage a subscription of the building, user, and/or tenant while the entitlement service 134 can track entitlements of the buildings, users, and/or tenants.

The twin manager 108 can be configured to manage and maintain a digital twin. The digital twin can be a digital representation of the physical environment, e.g., a building. The twin manager 108 can include a change feed generator 152, a schema and ontology 154, a projection manager 156, a policy manager 158, an entity, relationship, and event database 160, and a graph projection database 162.

Figure 11:
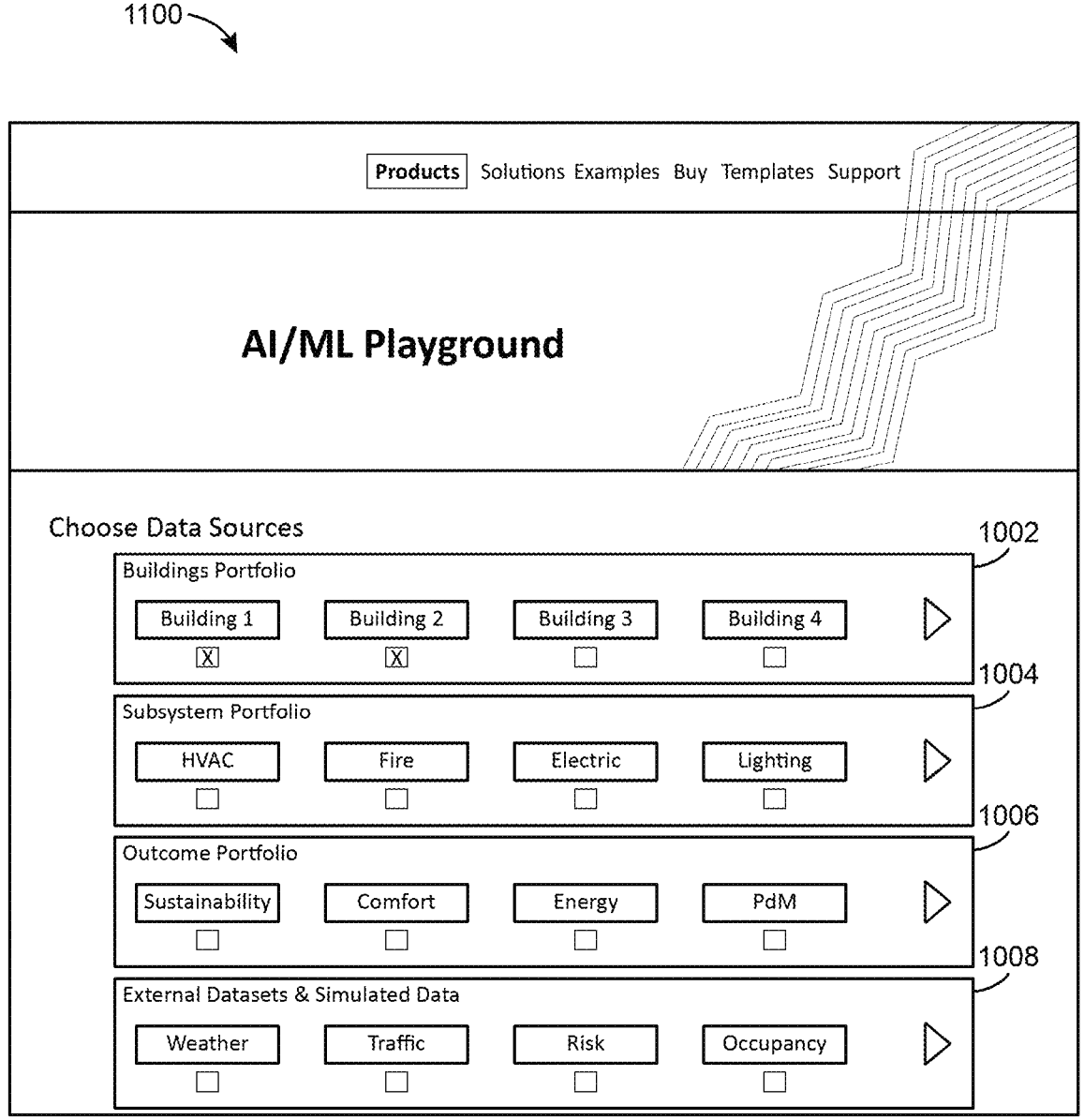
FIG. 11 is a user interface where a user selects data sources that generate data to be used in the AI/ML project, according to an exemplary embodiment.
Figure 12:
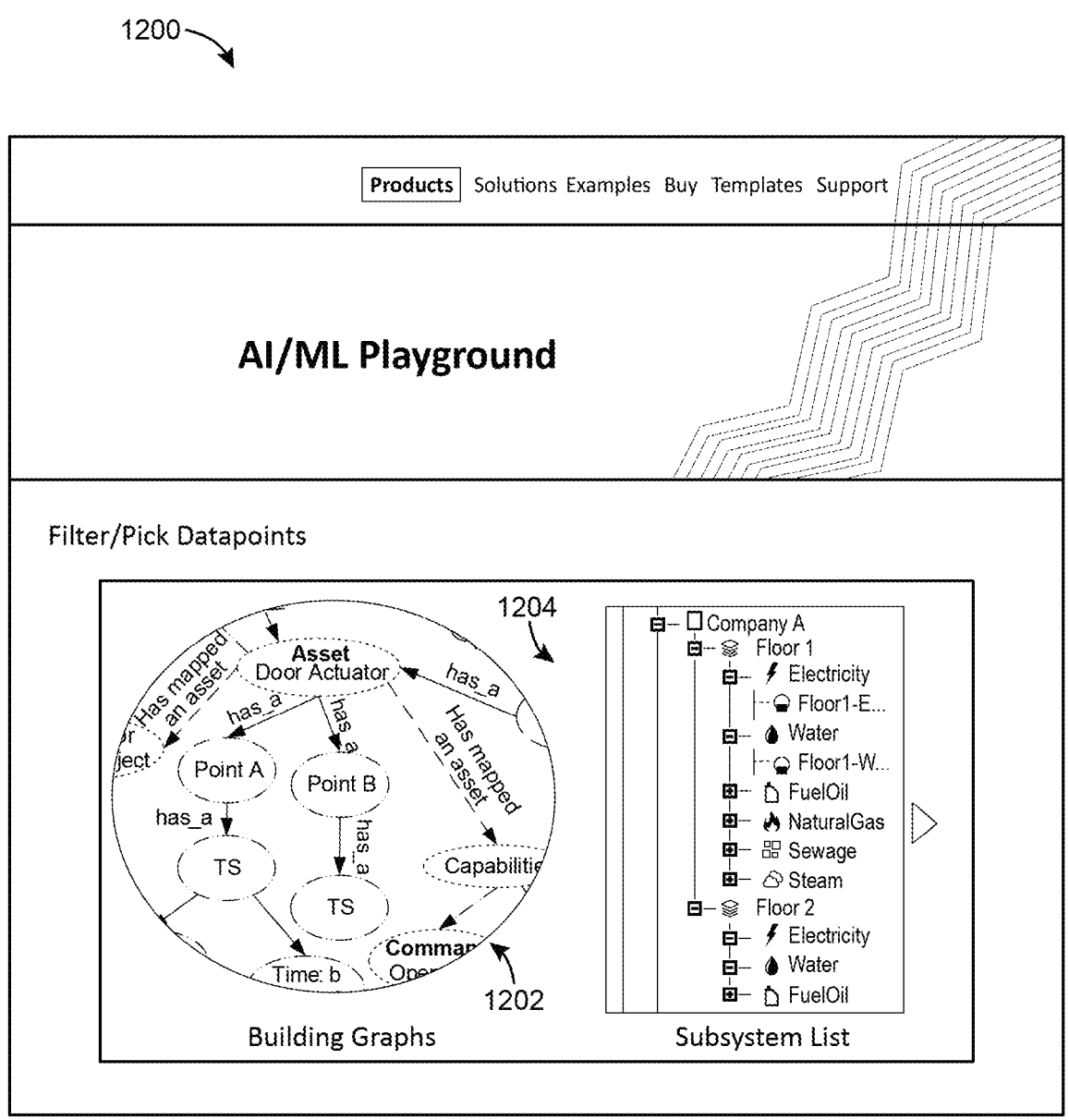
FIG. 12 is a user interface where a user selects a format for reviewing and selecting data points for the AI/ML project, according to an exemplary embodiment.
Figure 13:
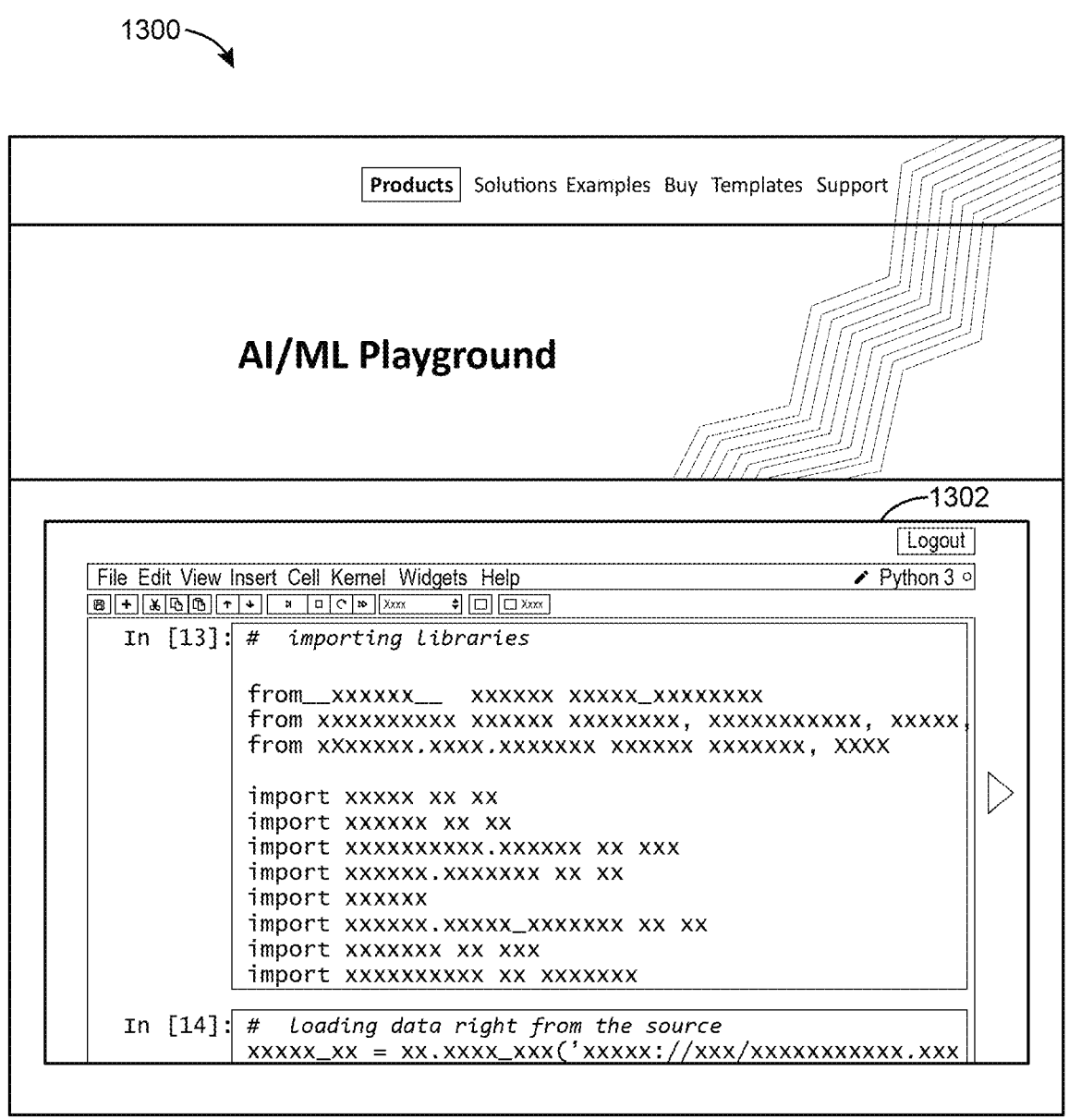
FIG. 13 is a user interface where a user designs and/or modifies an AI and/or ML model for the AI/ML project, according to an exemplary embodiment.

The graph projection manager 156 can be configured to construct graph projections and store the graph projections in the graph projection database 162. Examples of graph projections are shown in FIGS. 11-13. Entities, relationships, and events can be stored in the database 160. The graph projection manager 156 can retrieve entities, relationships, and/or events from the database 160 and construct a graph projection based on the retrieved entities, relationships and/or events. In some embodiments, the database 160 includes an entity-relationship collection for multiple subscriptions.

In some embodiment, the graph projection manager 156 generates a graph projection for a particular user, application, subscription, and/or system. In this regard, the graph projection can be generated based on policies for the particular user, application, and/or system in addition to an ontology specific for that user, application, and/or system. In this regard, an entity could request a graph projection and the graph projection manager 156 can be configured to generate the graph projection for the entity based on policies and an ontology specific to the entity. The policies can indicate what entities, relationships, and/or events the entity has access to. The ontology can indicate what types of relationships between entities the requesting entity expects to see, e.g., floors within a building, devices within a floor, etc. Another requesting entity may have an ontology to see devices within a building and applications for the devices within the graph.

The graph projections generated by the graph projection manager 156 and stored in the graph projection database 162 can be a knowledge graph and is an integration point. For example, the graph projections can represent floor plans and systems associated with each floor. Furthermore, the graph projections can include events, e.g., telemetry data of the building subsystems 122. The graph projections can show application services as nodes and API calls between the services as edges in the graph. The graph projections can illustrate the capabilities of spaces, users, and/or devices. The graph projections can include indications of the building subsystems 122, e.g., thermostats, cameras, VAVs, etc. The graph projection database 162 can store graph projections that keep up a current state of a building.

The graph projections of the graph projection database 162 can be digital twins of a building. Digital twins can be digital replicas of physical entities that enable an in-depth analysis of data of the physical entities and provide the potential to monitor systems to mitigate risks, manage issues, and utilize simulations to test future solutions. Digital twins can play an important role in helping technicians find the root cause of issues and solve problems faster, in supporting safety and security protocols, and in supporting building managers in more efficient use of energy and other facilities resources. Digital twins can be used to enable and unify security systems, employee experience, facilities management, sustainability, etc.

In some embodiments the enrichment manager 138 can use a graph projection of the graph projection database 162 to enrich events. In some embodiments, the enrichment manager 138 can identify nodes and relationships that are associated with, and are pertinent to, the device that generated the event. For example, the enrichment manager 138 could identify a thermostat generating a temperature measurement event within the graph. The enrichment manager 138 can identify relationships between the thermostat and spaces, e.g., a zone that the thermostat is located in. The enrichment manager 138 can add an indication of the zone to the event.

Furthermore, the command processor 136 can be configured to utilize the graph projections to command the building subsystems 122. The command processor 136 can identify a policy for a commanding entity within the graph projection to determine whether the commanding entity has the ability to make the command. For example, the command processor 136, before allowing a user to make a command, determine, based on the graph projection database 162, to determine that the user has a policy to be able to make the command.

In some embodiments, the policies can be conditional based policies. For example, the building data platform 100 can apply one or more conditional rules to determine whether a particular system has the ability to perform an action. In some embodiments, the rules analyze a behavioral based biometric. For example, a behavioral based biometric can indicate normal behavior and/or normal behavior rules for a system. In some embodiments, when the building data platform 100 determines, based on the one or more conditional rules, that an action requested by a system does not match a normal behavior, the building data platform 100 can deny the system the ability to perform the action and/or request approval from a higher level system.

For example, a behavior rule could indicate that a user has access to log into a system with a particular IP address between 8 A.M. through 5 P.M. However, if the user logs in to the system at 7 P.M., the building data platform 100 may contact an administrator to determine whether to give the user permission to log in.

The change feed generator 152 can be configured to generate a feed of events that indicate changes to the digital twin, e.g., to the graph. The change feed generator 152 can track changes to the entities, relationships, and/or events of the graph. For example, the change feed generator 152 can detect an addition, deletion, and/or modification of a node or edge of the graph, e.g., changing the entities, relationships, and/or events within the database 160. In response to detecting a change to the graph, the change feed generator 152 can generate an event summarizing the change. The event can indicate what nodes and/or edges have changed and how the nodes and edges have changed. The events can be posted to a topic by the change feed generator 152.

The change feed generator 152 can implement a change feed of a knowledge graph. The building data platform 100 can implement a subscription to changes in the knowledge graph. When the change feed generator 152 posts events in the change feed, subscribing systems or applications can receive the change feed event. By generating a record of all changes that have happened, a system can stage data in different ways, and then replay the data back in whatever order the system wishes. This can include running the changes sequentially one by one and/or by jumping from one major change to the next. For example, to generate a graph at a particular time, all change feed events up to the particular time can be used to construct the graph.

The change feed can track the changes in each node in the graph and the relationships related to them, in some embodiments. If a user wants to subscribe to these changes and the user has proper access, the user can simply submit a web API call to have sequential notifications of each change that happens in the graph. A user and/or system can replay the changes one by one to reinstitute the graph at any given time slice. Even though the messages are "thin" and only include notification of change and the reference "id/seq id," the change feed can keep a copy of every state of each node and/or relationship so that a user and/or system can retrieve those past states at any time for each node. Furthermore, a consumer of the change feed could also create dynamic "views" allowing different "snapshots" in time of what the graph looks like from a particular context. While the twin manager 108 may contain the history and the current state of the graph based upon schema evaluation, a consumer can retain a copy of that data, and thereby create dynamic views using the change feed.

The schema and ontology 154 can define the message schema and graph ontology of the twin manager 108. The message schema can define what format messages received by the messaging manager 140 should have, e.g., what parameters, what formats, etc. The ontology can define graph projections, e.g., the ontology that a user wishes to view. For example, various systems, applications, and/or users can be associated with a graph ontology. Accordingly, when the graph projection manager 156 generates an graph projection for a user, system, or subscription, the graph projection manager 156 can generate a graph projection according to the ontology specific to the user. For example, the ontology can define what types of entities are related in what order in a graph, for example, for the ontology for a subscription of "Customer A," the graph projection manager 156 can create relationships for a graph projection based on the rule:

Region← →Building← →Floor← →Space← →Asset

For the ontology of a subscription of "Customer B," the graph projection manager 156 can create relationships based on the rule:

Building← →Floor← →Asset

The policy manager 158 can be configured to respond to requests from other applications and/or systems for policies. The policy manager 158 can consult a graph projection to determine what permissions different applications, users, and/or devices have. The graph projection can indicate various permissions that different types of entities have and the policy manager 158 can search the graph projection to identify the permissions of a particular entity. The policy manager 158 can facilitate fine grain access control with user permissions. The policy manager 158 can apply permissions across a graph, e.g., if "user can view all data associated with floor 1" then they see all subsystem data for that floor, e.g., surveillance cameras, HVAC devices, fire detection and response devices, etc.

The twin manager 108 includes a query manager 165 and a twin function manager 167. The query manger 164 can be configured to handle queries received from a requesting system, e.g., the user device 176, the applications 110, and/or any other system. The query manager 165 can receive queries that include query parameters and context. The query manager 165 can query the graph projection database 162 with the query parameters to retrieve a result. The query manager 165 can then cause an event processor, e.g., a twin function, to operate based on the result and the context. In some embodiments, the query manager 165 can select the twin function based on the context and/or perform operates based on the context. In some embodiments, the query manager 165 is configured to perform the operations described with reference to FIGS. 5-10.

The twin function manager 167 can be configured to manage the execution of twin functions. The twin function manager 167 can receive an indication of a context query that identifies a particular data element and/or pattern in the graph projection database 162. Responsive to the particular data element and/or pattern occurring in the graph projection database 162 (e.g., based on a new data event added to the graph projection database 162 and/or change to nodes or edges of the graph projection database 162, the twin function manager 167 can cause a particular twin function to execute. The twin function can execute based on an event, context, and/or rules. The event can be data that the twin function executes against. The context can be information that provides a contextual description of the data, e.g., what device the event is associated with, what control point should be updated based on the event, etc. The twin function manager 167 can be configured to perform the operations of the FIGS. 11-15.

Figure 2:
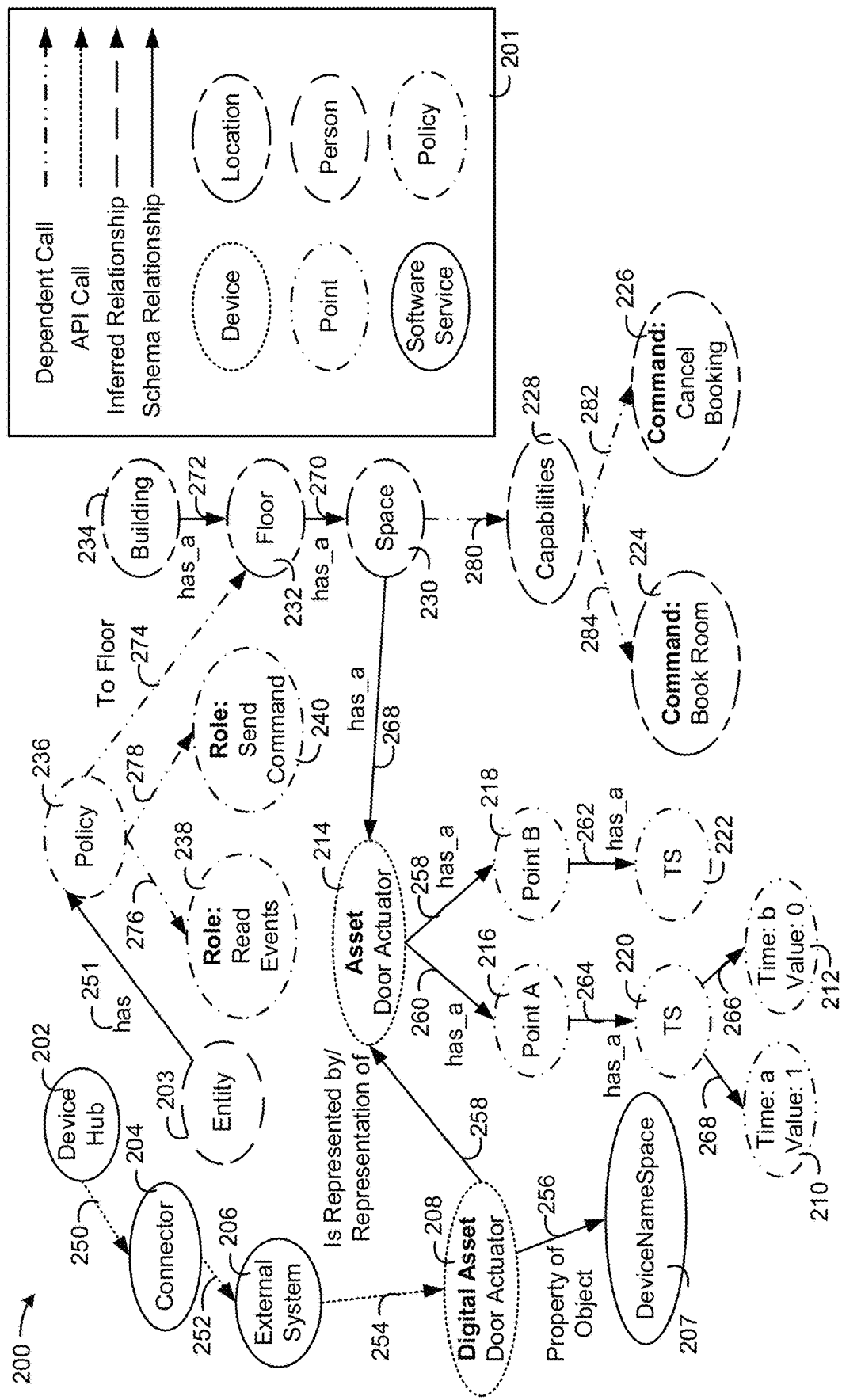
FIG. 2 is a graph projection of the twin manager of FIG. 1 including application programming interface (API) data, capability data, policy data, and services, according to an exemplary embodiment.

Referring now to FIG. 2, a graph projection 200 of the twin manager 108 including application programming interface (API) data, capability data, policy data, and services is shown, according to an exemplary embodiment. The graph projection 200 includes nodes 202-240 and edges 250-272. The nodes 202-240 and the edges 250-272 are defined according to the key 201. The nodes 202-240 represent different types of entities, devices, locations, points, persons, policies, and software services (e.g., API services). The edges 250-272 represent relationships between the nodes 202-240, e.g., dependent calls, API calls, inferred relationships, and schema relationships (e.g., BRICK relationships).

The graph projection 200 includes a device hub 202 which may represent a software service that facilitates the communication of data and commands between the cloud platform 106 and a device of the building subsystems 122, e.g., door actuator 214. The device hub 202 is related to a connector 204, an external system 206, and a digital asset "Door Actuator" 208 by edge 250, edge 252, and edge 254.

The cloud platform 106 can be configured to identify the device hub 202, the connector 204, the external system 206 related to the door actuator 214 by searching the graph projection 200 and identifying the edges 250-254 and edge 258. The graph projection 200 includes a digital representation of the "Door Actuator," node 208. The digital asset "Door Actuator" 208 includes a "DeviceNameSpace" represented by node 207 and related to the digital asset "Door Actuator" 208 by the "Property of Object" edge 256.

The "Door Actuator" 214 has points and timeseries. The "Door Actuator" 214 is related to "Point A" 216 by a "has_a" edge 260. The "Door Actuator" 214 is related to "Point B" 218 by a "has_A" edge 258. Furthermore, timeseries associated with the points A and B are represented by nodes "TS" 220 and "TS" 222. The timeseries are related to the points A and B by "has_a" edge 264 and "has_a" edge 262. The timeseries "TS" 220 has particular samples, sample 210 and 212 each related to "TS" 220 with edges 268 and 266 respectively. Each sample includes a time and a value. Each sample may be an event received from the door actuator that the cloud platform 106 ingests into the entity, relationship, and event database 160, e.g., ingests into the graph projection 200.

The graph projection 200 includes a building 234 representing a physical building. The building includes a floor represented by floor 232 related to the building 234 by the "has_a" edge from the building 234 to the floor 232. The floor has a space indicated by the edge "has_a" 270 between the floor 232 and the space 230. The space has particular capabilities, e.g., is a room that can be booked for a meeting, conference, private study time, etc. Furthermore, the booking can be canceled. The capabilities for the floor 232 are represented by capabilities 228 related to space 230 by edge 280. The capabilities 228 are related to two different commands, command "book room" 224 and command "cancel booking" 226 related to capabilities 228 by edge 284 and edge 282 respectively.

If the cloud platform 106 receives a command to book the space represented by the node, space 230, the cloud platform 106 can search the graph projection 200 for the capabilities for the 228 related to the space 230 to determine whether the cloud platform 106 can book the room.

In some embodiments, the cloud platform 106 could receive a request to book a room in a particular building, e.g., the building 234. The cloud platform 106 could search the graph projection 200 to identify spaces that have the capabilities to be booked, e.g., identify the space 230 based on the capabilities 228 related to the space 230. The cloud platform 106 can reply to the request with an indication of the space and allow the requesting entity to book the space 230.

The graph projection 200 includes a policy 236 for the floor 232. The policy 236 is related set for the floor 232 based on a "To Floor" edge 274 between the policy 236 and the floor 232. The policy 236 is related to different roles for the floor 232, read events 238 via edge 276 and send command 240 via edge 278. The policy 236 is set for the entity 203 based on has edge 251 between the entity 203 and the policy 236.

The twin manager 108 can identify policies for particular entities, e.g., users, software applications, systems, devices, etc. based on the policy 236. For example, if the cloud platform 106 receives a command to book the space 230. The cloud platform 106 can communicate with the twin manager 108 to verify that the entity requesting to book the space 230 has a policy to book the space. The twin manager 108 can identify the entity requesting to book the space as the entity 203 by searching the graph projection 200. Furthermore, the twin manager 108 can further identify the edge has 251 between the entity 203 and the policy 236 and the edge 1178 between the policy 236 and the command 240.

Furthermore, the twin manager 108 can identify that the entity 203 has the ability to command the space 230 based on the edge 1174 between the policy 236 and the edge 270 between the floor 232 and the space 230. In response to identifying the entity 203 has the ability to book the space 230, the twin manager 108 can provide an indication to the cloud platform 106.

Furthermore, if the entity makes a request to read events for the space 230, e.g., the sample 210 and the sample 212, the twin manager 108 can identify the edge has 251 between the entity 203 and the policy 236, the edge 1178 between the policy 236 and the read events 238, the edge 1174 between the policy 236 and the floor 232, the "has_a" edge 270 between the floor 232 and the space 230, the edge 268 between the space 230 and the door actuator 214, the edge 260 between the door actuator 214 and the point A 216, the "has_a" edge 264 between the point A 216 and the TS 220, and the edges 268 and 266 between the TS 220 and the samples 210 and 212 respectively.

Figure 3:
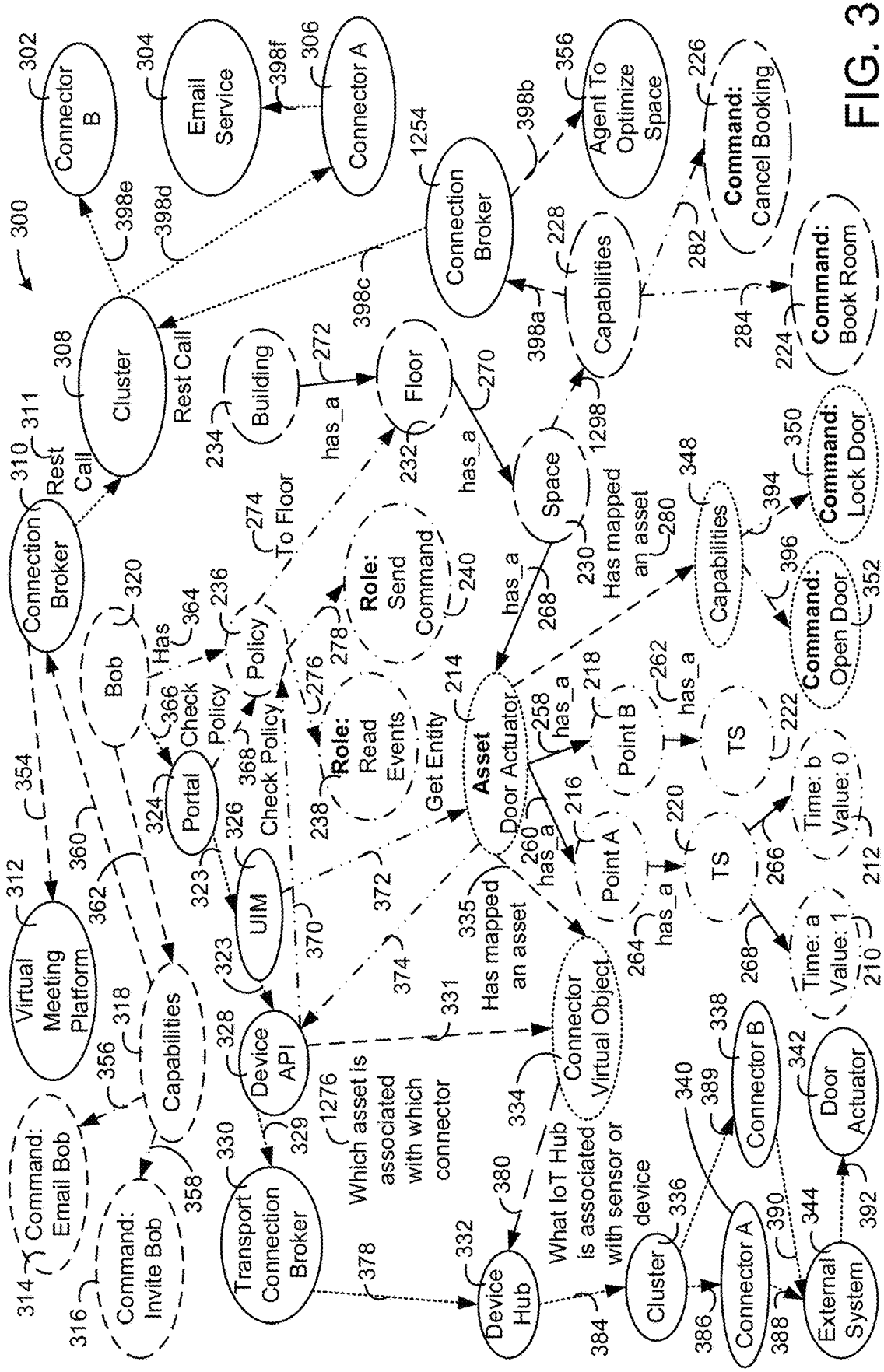
FIG. 3 is another graph projection of the twin manager of FIG. 1 including application programming interface (API) data, capability data, policy data, and services, according to an exemplary embodiment.

Referring now to FIG. 3, a graph projection 300 of the twin manager 108 including application programming interface (API) data, capability data, policy data, and services is shown, according to an exemplary embodiment. The graph projection 300 includes the nodes and edges described in the graph projection 200 of FIG. 2. The graph projection 300 includes a connection broker 354 related to capabilities 228 by edge 398a. The connection broker 354 can be a node representing a software application configured to facilitate a connection with another software application. In some embodiments, the cloud platform 106 can identify the system that implements the capabilities 228 by identifying the edge 398a between the capabilities 228 and the connection broker 354.

The connection broker 354 is related to an agent that optimizes a space 356 via edge 398b. The agent represented by the node 356 can book and cancel bookings for the space represented by the node 230 based on the edge 398b between the connection broker 354 and the node 356 and the edge 398a between the capabilities 228 and the connection broker 354.

The connection broker 354 is related to a cluster 308 by edge 398c. Cluster 308 is related to connector B 302 via edge 398e and connector A 306 via edge 398d. The connector A 306 is related to an external subscription service 304. A connection broker 310 is related to cluster 308 via an edge 311 representing a rest call that the connection broker represented by node 310 can make to the cluster represented by cluster 308.

The connection broker 310 is related to a virtual meeting platform 312 by an edge 354. The node 312 represents an external system that represents a virtual meeting platform. The connection broker represented by node 310 can represent a software component that facilitates a connection between the cloud platform 106 and the virtual meeting platform represented by node 312. When the cloud platform 106 needs to communicate with the virtual meeting platform represented by the node 312, the cloud platform 106 can identify the edge 354 between the connection broker 310 and the virtual meeting platform 312 and select the connection broker represented by the node 310 to facilitate communication with the virtual meeting platform represented by the node 312.

A capabilities node 318 can be connected to the connection broker 310 via edge 360. The capabilities 318 can be capabilities of the virtual meeting platform represented by the node 312 and can be related to the node 312 through the edge 360 to the connection broker 310 and the edge 354 between the connection broker 310 and the node 312. The capabilities 318 can define capabilities of the virtual meeting platform represented by the node 312. The node 320 is related to capabilities 318 via edge 362. The capabilities may be an invite bob command represented by node 316 and an email bob command represented by node 314. The capabilities 318 can be linked to a node 320 representing a user, Bob. The cloud platform 106 can facilitate email commands to send emails to the user Bob via the email service represented by the node 304. The node 304 is related to the connect a node 306 via edge 398f. Furthermore, the cloud platform 106 can facilitate sending an invite for a virtual meeting via the virtual meeting platform represented by the node 312 linked to the node 318 via the edge 358.

The node 320 for the user Bob can be associated with the policy 236 via the "has" edge 364. Furthermore, the node 320 can have a "check policy" edge 366 with a portal node 324. The device API node 328 has a check policy edge 370 to the policy node 236. The portal node 324 has an edge 368 to the policy node 236. The portal node 324 has an edge 323 to a node 326 representing a user input manager (UIM). The portal node 324 is related to the UIM node 326 via an edge 323. The UIM node 326 has an edge 323 to a device API node 328. The UIM node 326 is related to the door actuator node 214 via edge 372. The door actuator node 214 has an edge 374 to the device API node 328. The door actuator 214 has an edge 335 to the connector virtual object 334. The device hub 332 is related to the connector virtual object via edge 380. The device API node 328 can be an API for the door actuator 214. The connector virtual object 334 is related to the device API node 328 via the edge 331.

The device API node 328 is related to a transport connection broker 330 via an edge 329. The transport connection broker 330 is related to a device hub 332 via an edge 378. The device hub represented by node 332 can be a software component that hands the communication of data and commands for the door actuator 214. The cloud platform 106 can identify where to store data within the graph projection 300 received from the door actuator by identifying the nodes and edges between the points 216 and 218 and the device hub node 332. Similarly, the cloud platform 308 can identify commands for the door actuator that can be facilitated by the device hub represented by the node 332, e.g., by identifying edges between the device hub node 332 and an open door node 352 and an lock door node 350. The door actuator 114 has an edge "has mapped an asset" 280 between the node 214 and a capabilities node 348. The capabilities node 348 and the nodes 352 and 350 are linked by edges 396 and 394.

The device hub 332 is linked to a cluster 336 via an edge 384. The cluster 336 is linked to connector A 340 and connector B 338 by edges 386 and the edge 389. The connector A 340 and the connector B 338 is linked to an external system 344 via edges 388 and 390. The external system 344 is linked to a door actuator 342 via an edge 392.

Figure 4:
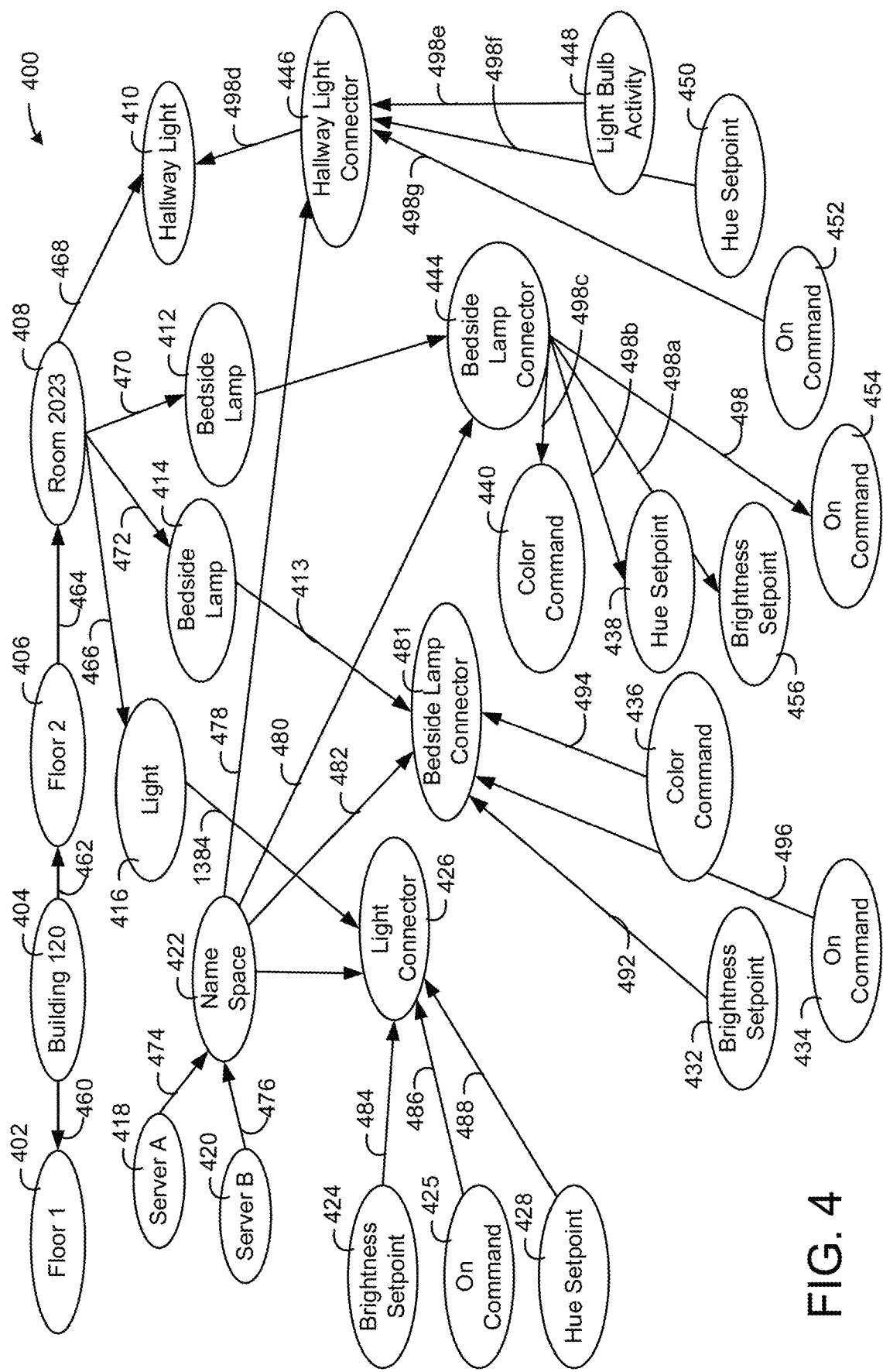
FIG. 4 is a graph projection of the twin manager of FIG. 1 including equipment and capability data for the equipment, according to an exemplary embodiment.

Referring now to FIG. 4, a graph projection 400 of the twin manager 108 including equipment and capability data for the equipment is shown, according to an exemplary embodiment. The graph projection 400 includes nodes 402-456 and edges 360-498f. The cloud platform 106 can search the graph projection 400 to identify capabilities of different pieces of equipment.

A building node 404 represents a particular building that includes two floors. A floor 1 node 402 is linked to the building node 404 via edge 460 while a floor 2 node 406 is linked to the building node 404 via edge 462. The floor 2 includes a particular room 2023 represented by edge 464 between floor 2 node 406 and room 2023 node 408. Various pieces of equipment are included within the room 2023. A light represented by light node 416, a bedside lamp node 414, a bedside lamp node 412, and a hallway light node 410 are related to room 2023 node 408 via edge 466, edge 472, edge 470, and edge 468.

The light represented by light node 416 is related to a light connector 426 via edge 484. The light connector 426 is related to multiple commands for the light represented by the light node 416 via edges 484, 486, and 488. The commands may be a brightness setpoint 424, an on command 425, and a hue setpoint 428. The cloud platform 106 can receive a request to identify commands for the light represented by the light 416 and can identify the nodes 424-428 and provide an indication of the commands represented by the node 424-428 to the requesting entity. The requesting entity can then send commands for the commands represented by the nodes 424-428.

The bedside lamp node 414 is linked to a bedside lamp connector 481 via an edge 413. The connector 481 is related to commands for the bedside lamp represented by the bedside lamp node 414 via edges 492, 496, and 494. The command nodes are a brightness setpoint node 432, an on command node 434, and a color command 436. The hallway light 410 is related to a hallway light connector 446 via an edge 498d. The hallway light connector 446 is linked to multiple commands for the hallway light node 410 via edges 498g, 498f, and 498e. The commands are represented by an on command node 452, a hue setpoint node 450, and a light bulb activity node 448.

The graph projection 400 includes a name space node 422 related to a server A node 418 and a server B node 420 via edges 474 and 476. The name space node 422 is related to the bedside lamp connector 481, the bedside lamp connector 444, and the hallway light connector 446 via edges 482, 480, and 478. The bedside lamp connector 444 is related to commands, e.g., the color command node 440, the hue setpoint command 438, a brightness setpoint command 456, and an on command 454 via edges 498c, 498b, 498a, and 498.

Figure 5:
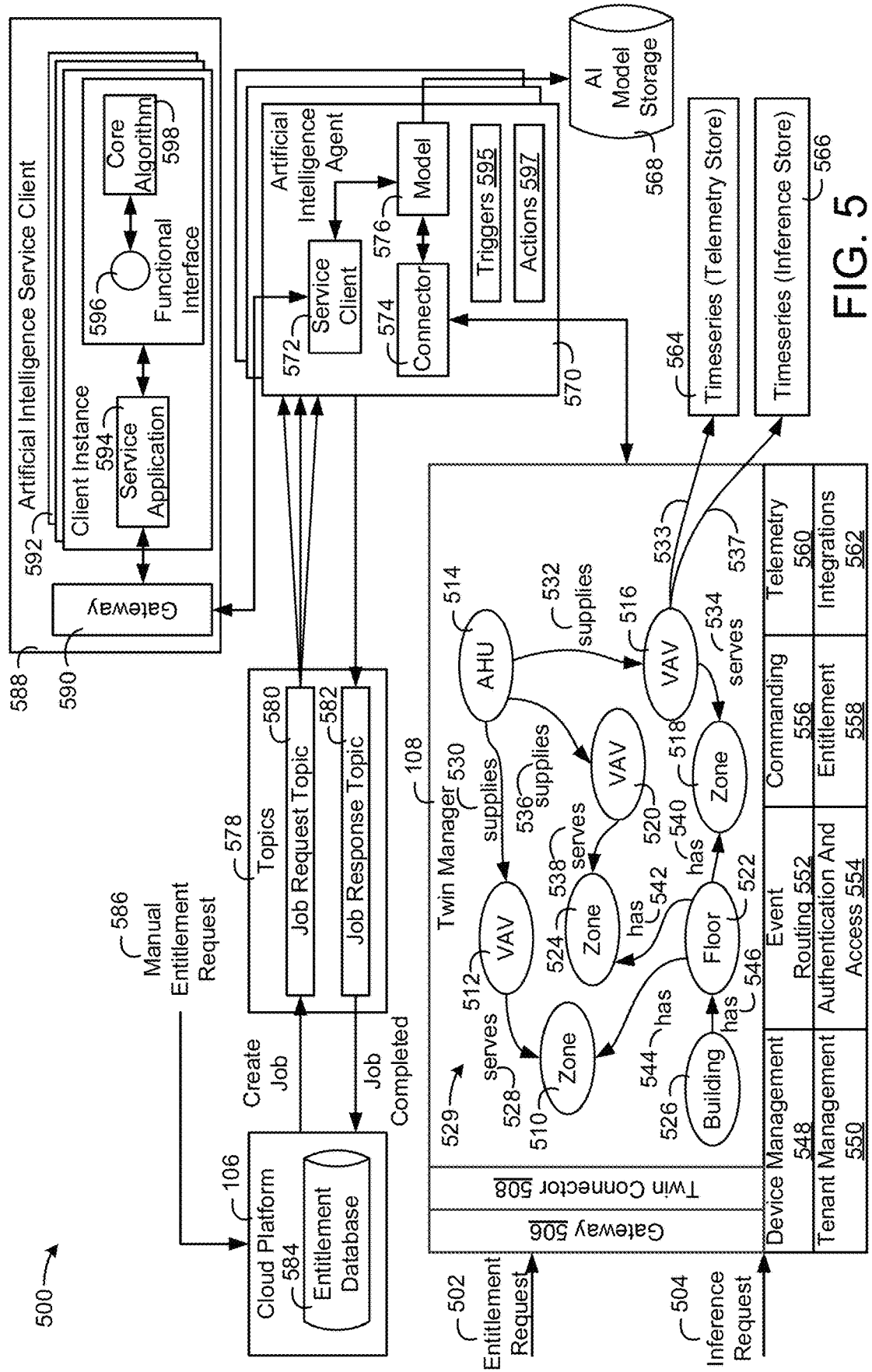
FIG. 5 is a block diagram of a system for managing a digital twin where an artificial intelligence agent can be executed to infer information for an entity of a graph, according to an exemplary embodiment.

Referring now to FIG. 5, a system 500 for managing a digital twin where an artificial intelligence agent can be executed to infer and/or predict information for an entity of a graph is shown, according to an exemplary embodiment. The system 500 can be components of the building data platform 100, e.g., components run on the processors and memories of the edge platform 102, the cloud platform 106, the twin manager 108, and/or the applications 110. The system 500 can, in some implementations, implement a digital twin with artificial intelligence.

A digital twin (or a shadow) may be a computing entity that describes a physical thing (e.g., a building, spaces of a building, devices of a building, people of the building, equipment of the building, etc.) through modeling the physical thing through a set of attributes that define the physical thing. A digital twin can refer to a digital replica of physical assets (a physical device twin) and can be extended to store processes, people, places, systems that can be used for various purposes. The digital twin can include both the ingestion of information and actions learned and executed through artificial intelligence agents.

In FIG. 5, the digital twin can be a graph 529 managed by the twin manager 108 and/or artificial intelligence agents 570. In some embodiments, the digital twin is the combination of the graph 529 with the artificial intelligence agents 570. In some embodiments, the digital twin enables the creation of a chronological time-series database of telemetry events for analytical purposes. In some embodiments, the graph 529 uses the BRICK schema.

The twin manager 108 stores the graph 529 which may be a graph data structure including various nodes and edges interrelating the nodes. The graph 529 may be the same as, or similar to, the graph projections described herein with reference to FIGS. 1-4. The graph 529 includes nodes 510-526 and edges 528-546. The graph 529 includes a building node 526 representing a building that has a floor indicated by the "has" edge 546 to the floor node 522. The floor node 522 is relate to a zone node 510 via a "has" edge 544 indicating that the floor represented by the node 522 has a zone represented by the zone 510.

The floor node 522 is related to the zone node 518 by the "has" edge 540 indicating that the floor represented by the floor node 522 has another zone represented by the zone node 518. The floor node 522 is related to another zone node 524 via a "has" edge 542 representing that the floor represented by the floor node 522 has a third zone represented by the zone node 524.

The graph 529 includes an AHU node 514 representing an AHU of the building represented by the building node 526. The AHU node 514 is related by a "supplies" edge 530 to the VAV node 512 to represent that the AHU represented by the AHU node 514 supplies air to the VAV represented by the VAV node 512. The AHU node 514 is related by a "supplies" edge 536 to the VAV node 520 to represent that the AHU represented by the AHU node 514 supplies air to the VAV represented by the VAV node 520. The AHU node 514 is related by a "supplies" edge 532 to the VAV node 516 to represent that the AHU represented by the AHU node 514 supplies air to the VAV represented by the VAV node 516.

The VAV node 516 is related to the zone node 518 via the "serves" edge 534 to represent that the VAV represented by the VAV node 516 serves (e.g., heats or cools) the zone represented by the zone node 518. The VAV node 520 is related to the zone node 524 via the "serves" edge 538 to represent that the VAV represented by the VAV node 520 serves (e.g., heats or cools) the zone represented by the zone node 524. The VAV node 512 is related to the zone node 510 via the "serves" edge 528 to represent that the VAV represented by the VAV node 512 serves (e.g., heats or cools) the zone represented by the zone node 510.

Furthermore, the graph 529 includes an edge 533 related to a timeseries node 564. The timeseries node 564 can be information stored within the graph 529 and/or can be information stored outside the graph 529 in a different database (e.g., a timeseries database). In some embodiments, the timeseries node 564 stores timeseries data (or any other type of data) for a data point of the VAV represented by the VAV node 516. The data of the timeseries node 564 can be aggregated and/or collected telemetry data of the timeseries node 564.

Furthermore, the graph 529 includes an edge 537 related to a timeseries node 566. The timeseries node 566 can be information stored within the graph 529 and/or can be information stored outside the graph 529 in a different database (e.g., a timeseries database). In some embodiments, the timeseries node 566 stores timeseries data (or any other type of data) for a data point of the VAV represented by the VAV node 516. The data of the timeseries node 564 can be inferred information, e.g., data inferred by one of the artificial intelligence agents 570 and written into the timeseries node 564 by the artificial intelligence agent 570. In some embodiments, the timeseries 546 and/or 566 are stored in the graph 529 but are stored as references to timeseries data stored in a timeseries database.

The twin manager 108 includes various software components. For example, the twin manager 108 includes a device management component 548 for managing devices of a building. The twin manager 108 includes a tenant management component 550 for managing various tenant subscriptions. The twin manager 108 includes an event routing component 552 for routing various events. The twin manager 108 includes an authentication and access component 554 for performing user and/or system authentication and grating the user and/or system access to various spaces, pieces of software, devices, etc. The twin manager 108 includes a commanding component 556 allowing a software application and/or user to send commands to physical devices. The twin manager 108 includes an entitlement component 558 that analyzes the entitlements of a user and/or system and grants the user and/or system abilities based on the entitlements. The twin manager 108 includes a telemetry component 560 that can receive telemetry data from physical systems and/or devices and ingest the telemetry data into the graph 529. Furthermore, the twin manager 108 includes an integrations component 562 allowing the twin manager 108 to integrate with other applications.

The twin manager 108 includes a gateway 506 and a twin connector 508. The gateway 506 can be configured to integrate with other systems and the twin connector 508 can be configured to allow the gateway 506 to integrate with the twin manager 108. The gateway 506 and/or the twin connector 508 can receive an entitlement request 502 and/or an inference request 504. The entitlement request 502 can be a request received from a system and/or a user requesting that an AI agent action be taken by the AI agent 570. The entitlement request 502 can be checked against entitlements for the system and/or user to verify that the action requested by the system and/or user is allowed for the user and/or system. The inference request 504 can be a request that the AI agent 570 generates an inference, e.g., a projection of information, a prediction of a future data measurement, an extrapolated data value, etc.

The cloud platform 106 is shown to receive a manual entitlement request 586. The request 586 can be received from a system, application, and/or user device (e.g., from the applications 110, the building subsystems 122, and/or the user device 176). The manual entitlement request 586 may be a request for the AI agent 570 to perform an action, e.g., an action that the requesting system and/or user has an entitlement for. The cloud platform 106 can receive the manual entitlement request 586 and check the manual entitlement request 586 against an entitlement database 584 storing a set of entitlements to verify that the requesting system has access to the user and/or system. The cloud platform 106, responsive to the manual entitlement request 586 being approved, can create a job for the AI agent 570 to perform. The created job can be added to a job request topic 580 of a set of topics 578.

The job request topic 580 can be fed to AI agents 570. For example, the topics 580 can be fanned out to various AI agents 570 based on the AI agent that each of the topics 580 pertains to (e.g., based on an identifier that identifies an agent and is included in each job of the topic 580). The AI agents 570 include a service client 572, a connector 574, and a model 576. The model 576 can be loaded into the AI agent 570 from a set of AI models stored in the AI model storage 568. The AI model storage 568 can store models for making energy load predictions for a building, weather forecasting models for predicting a weather forecast, action/decision models to take certain actions responsive to certain conditions being met, an occupancy model for predicting occupancy of a space and/or a building, etc. The models of the AI model storage 568 can be neural networks (e.g., convolutional neural networks, recurrent neural networks, deep learning networks, etc.), decision trees, support vector machines, and/or any other type of artificial intelligence, machine learning, and/or deep learning category. In some embodiments, the models are rule based triggers and actions that include various parameters for setting a condition and defining an action.

The AI agent 570 can include triggers 595 and actions 597. The triggers 595 can be conditional rules that, when met, cause one or more of the actions 597. The triggers 595 can be executed based on information stored in the graph 529 and/or data received from the building subsystems 122. The actions 597 can be executed to determine commands, actions, and/or outputs. The output of the actions 597 can be stored in the graph 529 and/or communicated to the building subsystems 122.

The AI agent 570 can include a service client 572 that causes an instance of an AI agent to run. The instance can be hosted by the artificial intelligence service client 588. The client 588 can cause a client instance 592 to run and communicate with the AI agent 570 via a gateway 590. The client instance 592 can include a service application 594 that interfaces with a core algorithm 598 via a functional interface 596. The core algorithm 598 can run the model 576, e.g., train the model 576 and/or use the model 576 to make inferences and/or predictions.

In some embodiments, the core algorithm 598 can be configured to perform learning based on the graph 529. In some embodiments, the core algorithm 598 can read and/or analyze the nodes and relationships of the graph 529 to make decisions. In some embodiments, the core algorithm 598 can be configured to use telemetry data (e.g., the timeseries data 564) from the graph 529 to make inferences on and/or perform model learning. In some embodiments, the result of the inferences can be the timeseries 566. In some embodiments, the timeseries 564 is an input into the model 576 that predicts the timeseries 566.

In some embodiments, the core algorithm 598 can generate the timeseries 566 as an inference for a data point, e.g., a prediction of values for the data point at future times. The timeseries 564 may be actual data for the data point. In this regard, the core algorithm 598 can learn and train by comparing the inferred data values against the true data values. In this regard, the model 576 can be trained by the core algorithm 598 to improve the inferences made by the model 576.

Figure 6:
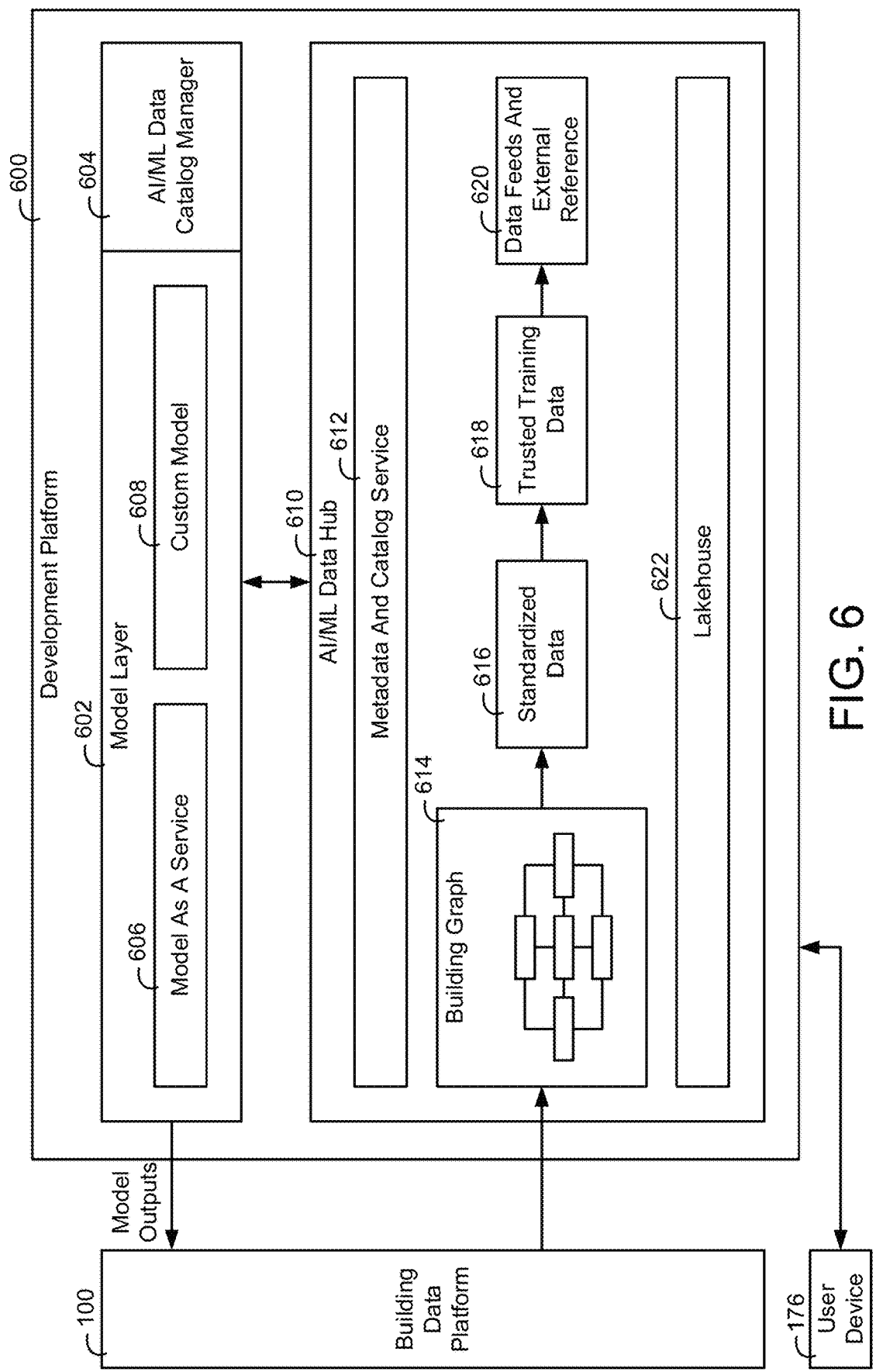
FIG. 6 is a block diagram of a development platform for developing AI and/or ML models, according to an exemplary embodiment.

Referring now to FIG. 6, a development platform 600 for developing AI and/or ML models is shown, according to an exemplary embodiment. The development platform 600 can operate to expedite the design and development of analytic models by providing a user with the ability to easily design, review, test, and/or update models that can be implemented for the building data platform 100 (e.g., by the twin manager 108). The development platform 600 can include a model layer 602 that handles the training and/or execution of models and an AI/ML data hub 610 that facilitates the model design and data management features of the development platform 600.

The hub 610 can receive (or access) data from the building data platform 100, e.g., the building graph 614 which can include one or more of the graphs described with reference to FIGS. 1-5 and data of the various entities represented in the graphs. The data can be received from various subsystems, digital twins, agents, etc. A user, via the user device 176 can, via the metadata and catalog service 612, search through the various subsystems, devices, locations, etc. of the knowledge graph and identify appropriate data points with which they are interested in building a model. The user selected data can be standardized (e.g., the standardized data 616) and/or verified (e.g., the trusted training data 618). The hub 610 can perform data reconciliation, pre-validation, tagging, labeling, enrichment, ETL'ed (extracted, transformed, loaded) for model training, etc. The hub 610 can further receive data feeds and external references 620 for performing training and/or execution on, e.g., external weather forecast feeds, Dataminr threat incidents, etc. The hub 610 can support data streaming and/or historian data loading, in some embodiments. The data of the hub 610 can, in some embodiments, be stored in a lakehouse 622 or other data storage component.

Figure 8:
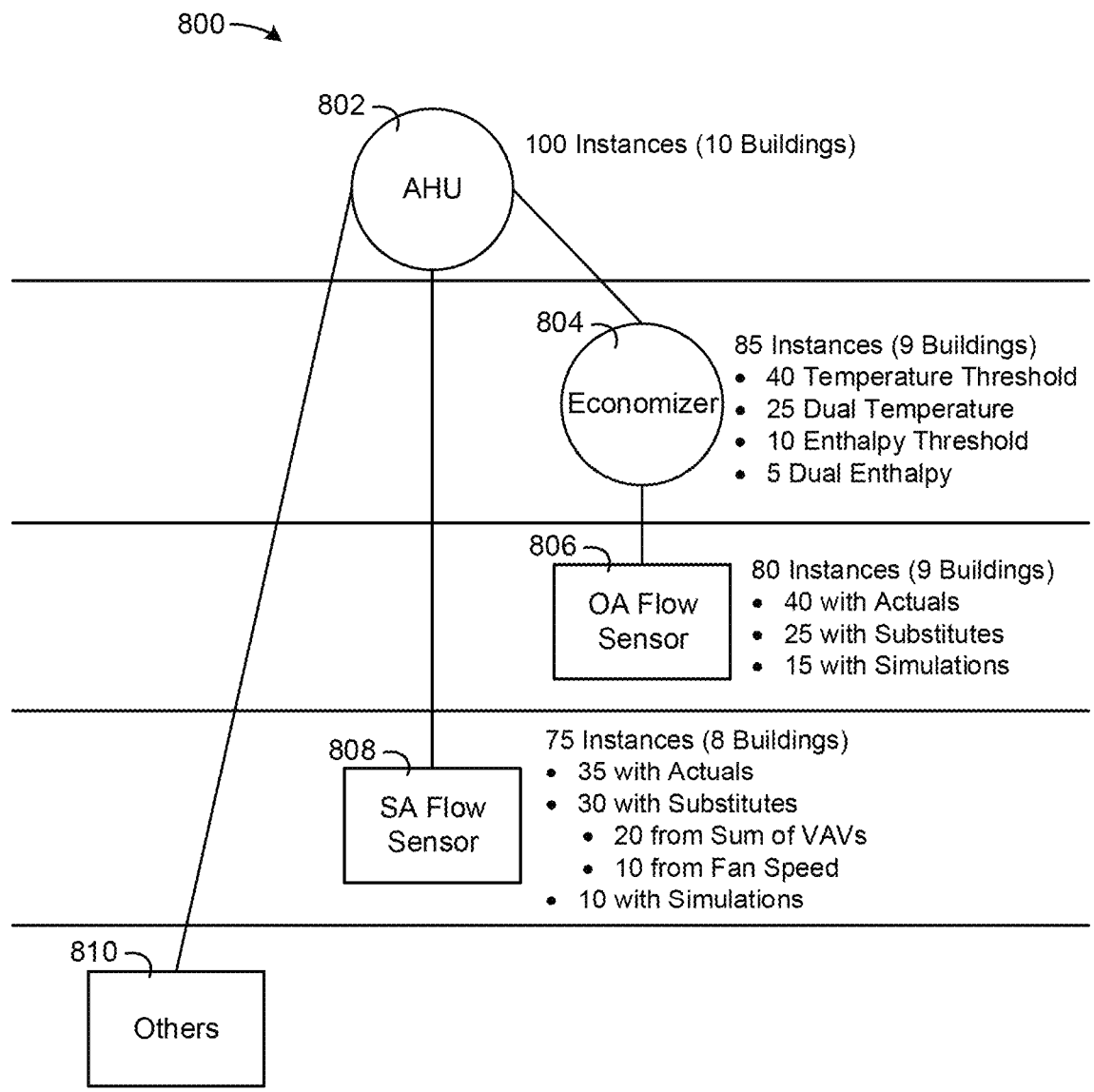
FIG. 8 is a block diagram of a graph template for querying a building graph to identify data for developing AI and/or ML models, according to an exemplary embodiment.

The hub 610 can, in some embodiments, query the knowledge graph to identify subsystems, devices, configuration data, and/or telemetry data needed for building models. In some embodiments, based on input from the user device 176 regarding the subsystems or points that the user is interested in, the hub 610 can construct a query (e.g., a SPARQL query) and use the query to query and/or navigate the building graph 614 to identify information. In some embodiments, the query can be built by a user interactively, e.g., using a query template building e.g., as shown in FIG. 8.

The model layer 602 can be configured to train and/or execute artificial intelligence and/or machine learning models based on the data aggregated and selected by the data hub 610. The models can include neural networks (e.g., Recurrent Neural networks, sequence to sequence neural networks, Long-Short Term Memory (LSTM) neural networks, convolutional neural networks, etc.), Bayesian Networks, Gaussian Networks, Decision Trees, Support Vector Machines, etc.

In some embodiments, the trained model is trained based on data selected by the user via the user device 176 and/or training parameters and/or model parameters selected by the user via the user device 176. The resulting model can be a custom model 608. In some embodiments, the model is offered as a service, e.g., model as a service 606. The service may be a subscription service where a user pays a monthly and/or annual fee to implement the model of the service for a particular building and/or group of buildings. Furthermore, the model layer 602 can implement data and/or model versioning to allow a user to backtrack through their model design and training to replicate experiments and understand the lineage of a model and how the performance of the model changes over time. The AI/ML data catalog manager 604 can perform the versioning and/or cataloging features of the model layer 602.

In some embodiments, the building data platform 100 can provide a digital twin that can simulate data points that cannot be directly measured for the building. For example, if a duct pressure is unknown but the digital twin can simulate the duct pressure, the development platform 600 can train models and/or perform inferences based on the simulated data point. If an actual data point is installed to measure the simulated data point, the development platform 600 can switch from operating based on the simulated data point to the measured data point. In some embodiments, the development platform 600 could borrow a different data point from the digital twin to substitute for a missing data point of the digital twin.

In some embodiments, a user can select between using simulated and measured data points to test the resiliency of the models generated by the model layer 602. In some embodiments, the hub 610 can switch between live and simulated telemetry data for running inferences, predictions, training, re-training, etc. for the model of the model layer 602. In some embodiments, the hub 610 could detect whether live telemetry is available for a particular data point used in a model. If the live telemetry is unavailable, the hub 610 could switch over to using a simulated telemetry data stream for the data point.

The hub 610 can enable a playground where missing telemetry/configuration data is simulated and/or substituted in some manner. For example, the hub 610 can implement substitution where one data point is substituted for another data point, e.g., weather station data is substituted for outside air telemetry data. In some embodiments, the hub 610 could aggregate and/or compute a data point from other data points. For example, based on the building graph 614, the hub 610 could generate an summed airflow for an air handling unit based on all downstream airflows of the air system. Similarly, the hub 610 could identify zone temperature points from the building graph 614 and generate an average zone temperature point. Furthermore, the hub 610 could fill in missing data points by running energy simulation models, e.g., EnergyPlus models.

In some embodiments, the building graph 614 can include data describing multiple different buildings and/or multiple different versions of one building. For example, the different building versions could include simulated data, actual data, historic data, etc. The data hub 610 can run model training and/or inference on different versions of the building and/or different buildings.

In some embodiments, the hub 610 can operate to recreate a digital twin of a building at a point in time via a time-machine operation. The operation may sort through data of the building, stored in the building graph 614, and produce a virtual representation at particular points in time. In some embodiments, the virtual representation can be used to test and/or validate models of the model layer 602. For example, training and/or testing of the models can be based on data of the building for various selected times.

Figure 7:
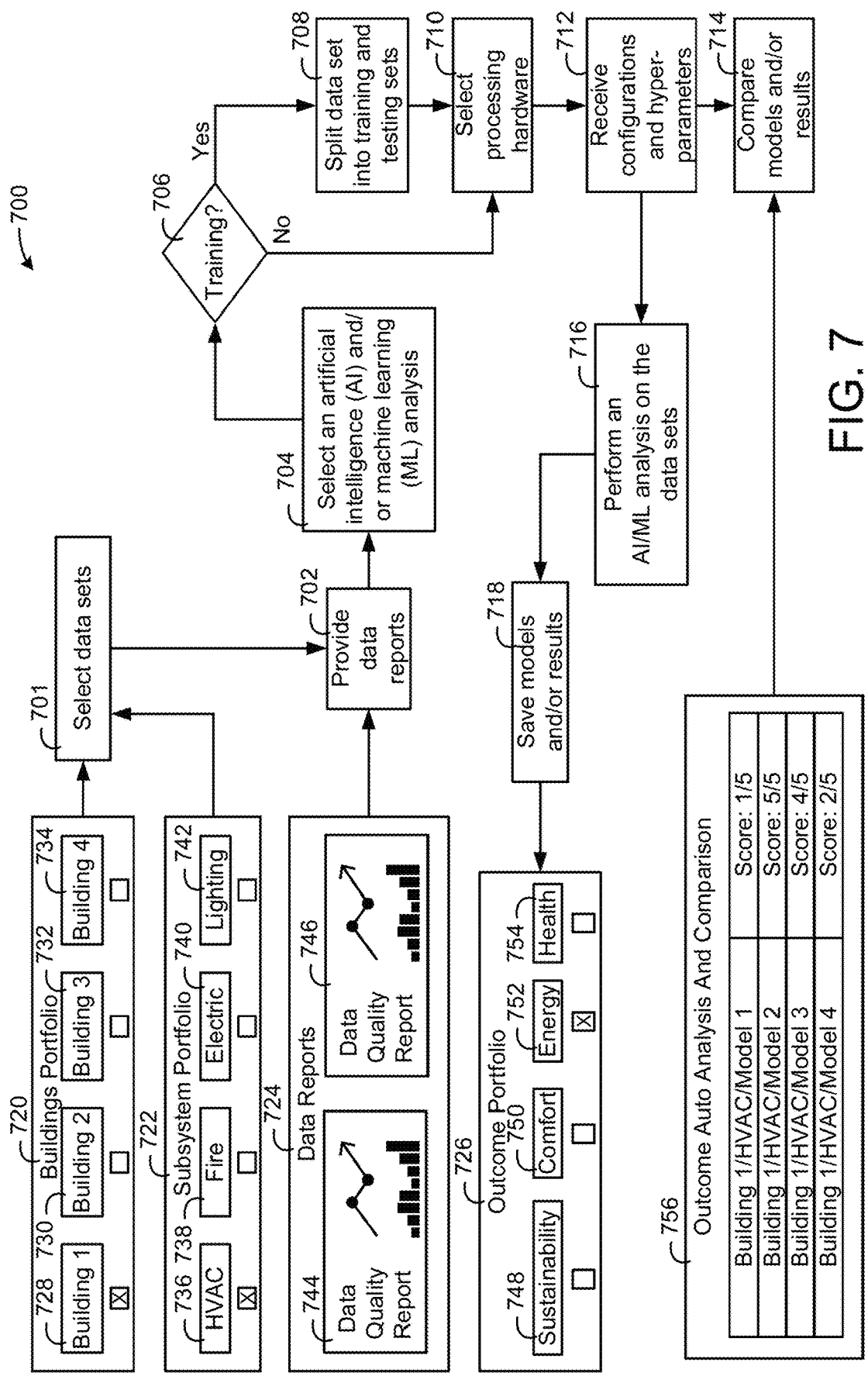
FIG. 7 is a flow diagram of a process for developing AI and/or ML models, according to an exemplary embodiment.

Referring now to FIG. 7, a process 700 for developing AI and/or ML models is shown, according to an exemplary embodiment. In some embodiments, the development platform 600 described with reference to FIG. 6 can be configured to perform the process 700. In some embodiments, the building data platform 100 (e.g., the twin manager 108, the applications 110, the cloud platform 106, and/or the edge platform 102) can be configured to perform the process 700.

In some embodiments, any computing device described herein can be configured to perform the process 700.

In step 701, the development platform 600 can select data sets for developing an AI/ML model. In some embodiments, the selection is user based, e.g., via the user device 176. The user may view elements, e.g., the buildings portfolio 720 and/or the subsystems portfolio 722 and select the various buildings and/or subsystems that they are interested in. The user can make selections of the buildings 728-734 via the element 720. Furthermore, the user can make selections of the subsystems 736-742 via the element 722. For example, if the user selects "Building 1" in the buildings portfolio element 720 and "HVAC" in the subsystem portfolio element 722, the development platform 600 may identify that all data points for HVAC subsystems in the "Building 1" should be selected. In some embodiments, the selection of the data can be made with a graph template constructed by a user via the user device 176. Based on the selection (e.g., either the selection in the elements 720 and 722 and/or the template), the development platform 600 can query the building graph 614. The query can identify all data points linked to an equipment entity specified in the selection.

In step 702, the development platform 600 can select data reports (e.g., data quality report 744 and/or data quality report 746) for the data selected in the step 701. The data reports can, in some embodiments, indicate reliability values, confidence intervals, average data values, historical data trends, statistical histograms of data values, etc. In some embodiments, the development platform 600 can provide the reports to a user via a display device of the user device 176. This can allow a user to review and confirm that the data they are building an AI/ML model on is reliable and will result in a proper model.

In step 704, the development platform 600 can select an AI and/or ML analysis. In some embodiments, multiple predefined analysis solutions already exist (e.g., the solutions are pre-built and/or pre-deployed), e.g., building load forecasting, fault detection and diagnostics (FDD), weather forecasting, energy reduction recommendation generator, energy prediction model (EPM), etc. In some embodiments, a user can select, via the user device 176, an analysis solution from the available set of predefined solutions.

In some embodiments, a user can develop code for an analysis solution. For example, a user could write code in an interface such as the interface shown in FIG. 13. In some embodiments, the development platform 600 can provide an API gateway that operates as an endpoint to connect models and/or expose trained models. For example, a user may connect a model from another system to the development platform 600 via the endpoint. In some embodiments the outputs of the various models are exposed via the API gateway for consuming applications.

In step 706, the development platform can select between training and/or not training the model. For example, for a model that is already trained (e.g., a pre-trained model is selected) the process 700 can proceed to the step 710. If the development platform 706 selects to perform training (e.g., for a selected model of the step 704 that is not pre-trained) the process can proceed to the step 708. In the step 708, the development platform 600 can split the selected data sets of the step 701 into a training data set and a testing data set. The training data set can be used for training the model selected in the step 704 while the testing data set can be used to score the performance of the trained model.

In step 710, the development platform 600 can select the processing hardware on which to train and/or deploy the selected model. In some embodiments, the development platform 600 can receive one or more user selections via the user device 176. The selections can be specific processor types, memory device types, processing allocations, memory allocations, etc. The development platform 600 can test the selected model on each of the processing hardware selections to identify how well each hardware selection performs.

In step 712, the development platform can receive configurations and/or hyper-parameters for the AI/ML analysis. The configurations and/or hyper-parameters can be settings for the model that are used in training. The development platform 600 can test different configurations to identify how well each configuration performs. In step 716, the development platform 600 can perform an AI/ML analysis on the data set and train the model. The model can be trained based on the training data set split in the step 708. In some embodiments, each model trained based on the training data set can be saved, in step 718, along with the training/testing results of the model in an outcome portfolio 726. The outcome portfolio 726 can catalog the models according to an outcome of the trained model, e.g., a sustainability outcome 748, a comfort outcome 750, an energy outcome 752, and/or a health outcome 754 (e.g., disease transmission level or general indoor air quality (IAQ)).

In some embodiments, the development platform 600 can run various experiments (e.g., in the cloud). The experiments can test deployment on various processing hardware configurations, test training on different hyper-parameters, run different training algorithms, etc. A testing score can be generated by the development platform 600 based on the testing data set of the step 708. The outcomes 756 can be generated automatically and compared against each other, in step 714. In some embodiments, the development platform 600 can select the highest scoring model. The highest scoring model can, in some embodiments, be versioned and/or deployed to run for the building data platform 100, e.g., be run based on building data collected by the building data platform 100.

In some embodiments, when the trained model is deployed, the output stream of the trained model (e.g., a data value, an event stream, a timeseries stream) can be saved back into the building graph 614. In some embodiments, the data could be stored as an inference event stream in a node (e.g., in the timeseries inference store 566). In some embodiments, ingesting the values into the building graph 614 can trigger an operation. For example, an ingested precooling temperature setpoint into the building graph 614 (e.g., a setpoint for cooling temperature of a space prior to it being occupied) could be consumed by a temperature control application, which implements temperature precooling based on the setpoint.

In some embodiments, the deployed models are monitored by the development platform 600. The development platform 600 could use data values of the building graph 614 to identify whether the performance of the models is drifting to a particular level. For example, if the deployed model predicts zone temperature, the development platform 600 could compare measured zone temperature to zone temperature predictions of the past to determine whether the model is operating properly. The result of the accuracy of a model drifting from a true value by a particular level may trigger the model to be retrained.

Referring now to FIG. 8, a graph template 800 for querying a building graph to identify data for developing AI and/or ML models is shown, according to an exemplary embodiment. In some embodiments, the graph template 800 is displayed to a user via a display of the user device 176 and/or the graph template 800 is constructed based on user input received from an input device of the user device 176. The user can select various nodes for specific entities and/or entity types. For each input to the graph template 800, the development platform 600 can query the building graph 614 for the current template and display the results on the template.

In some embodiments, the graph template 800 is constructed and used by development platform 600 to select data for constructing an AI/ML model as described in FIG. 7. In some embodiments, the user can mark the component nodes of the template 800 as either required and/or optional. Required nodes may cause the development platform 600 to select substitute and/or simulated data if actual data is not available. The template 800, and the data visualization provided in the template 800, can allow users to develop applications based on the actual availability of equipment and/or sensors, rather than having to guess which are likely to be present (and potentially only finding out later that the equipment and/or sensors do not exist). In some embodiments if a data point is missing, the development platform 600 can generate a notification indicating that a sensor or piece of equipment could be purchased and installed to allow for particular analytics to be developed and/or run.

For an AHU node 802, the development platform 602 can be configured to display an indication of how many instances of AHUs are in the building graph 614 and the number of buildings that include AHUs. The user may cause an economizer node 804 to be added to the template 800 linked to the AHU 802 via an edge. The development platform 602 can, based on the AHU node 802 being linked to the economizer 804, identify how many AHUs that include economizers (e.g., how many AHU nodes that are linked to economizer nodes via an edge) are present in the building graph 614 across a particular number of buildings. The development platform 602 can include indications of the number of instances of AHUs including economizers, how many use temperature thresholds, how many use dual temperature, how many use enthalpy thresholds, how many are dual enthalpy, etc.

Similarly, the user could add an outdoor air (OA) flow sensor node 806 to the template 800 connected to the economizer node 804 via an edge. The development platform 602 can query the building graph 614 based on the supply air (SA) flow sensor node 808 connected to the AHU node 802. The development platform 602 can identify the number of AHUs and indications of the number of buildings that include an economizer with an OA sensor and an SA flow sensor. The user can add various other nodes to the AHU node 802 via an edge as illustrated by the others node 810 which may represent a specific piece of equipment, data point, operational capability, etc.

The template based exploration of the building graph 614 can allow a user, e.g., a data scientist, to define a building graph template (e.g., the template 800) and look for specific instances of that template in existing buildings. As a user adjusts the template 800, the user can view see how many instances of that template remain across the chosen portfolio. Furthermore, in some embodiments, the return data displayed can be broken down by equipment subtype.

In some embodiments, when the user selects a sensor node (e.g., the OA flow sensor 806 and/or the SA flow sensor 808) the user can view the number of instances of AHUs that include that combination of sensors, the number of AHUs that could have another point substituted for the sensor by the development platform 600, and/or the number of AHUs that could have the value simulated by the development platform 600.

In some embodiments, a user can reorder the various components in the hierarchy shown in the template 800. This could allow the user to view which components are the most restrictive components in terms of data available. In some embodiments, higher level components must be considered when the development platform 600 identifies the data for lower level components. However, for a higher level component, the development platform 600 may not need to consider the presence of a lower level component when identifying the data. For example, the displayed data in a particular row of the template 800 may only be data filtered based on nodes of the same row and higher rows.

In some embodiments, the user can provide an indication to select a particular number of instances that are the highest performing matches to the template 800. The development platform 600 can prioritize data availability/quality as well as prioritizing actual sensor points instead of substituted and/or simulated data points. The development platform 600 can, in some embodiments, identify the most reliable data for systems that match the template 800 and select the systems with the most reliable data. The selected data can be used by the development platform 600 to drive development and/or testing for AI/ML models, applications, etc.

Instead of selecting the highest performing matches, the building data platform 600 could receive input from a user via the user device 176 to select a particular number of "realistic" datasets. In some embodiments, the building data platform 600 could match the template 800 onto the building graph 614 and identify nodes that match the template 800 that represent systems with a typical or most common configurations across the portfolio with respect to quality and/or presence (e.g., actual, simulated, substituted). A "realistic" dataset may allow a user to make a model more robust and verify that it will still work in non-ideal data scenarios.

Figure 9:
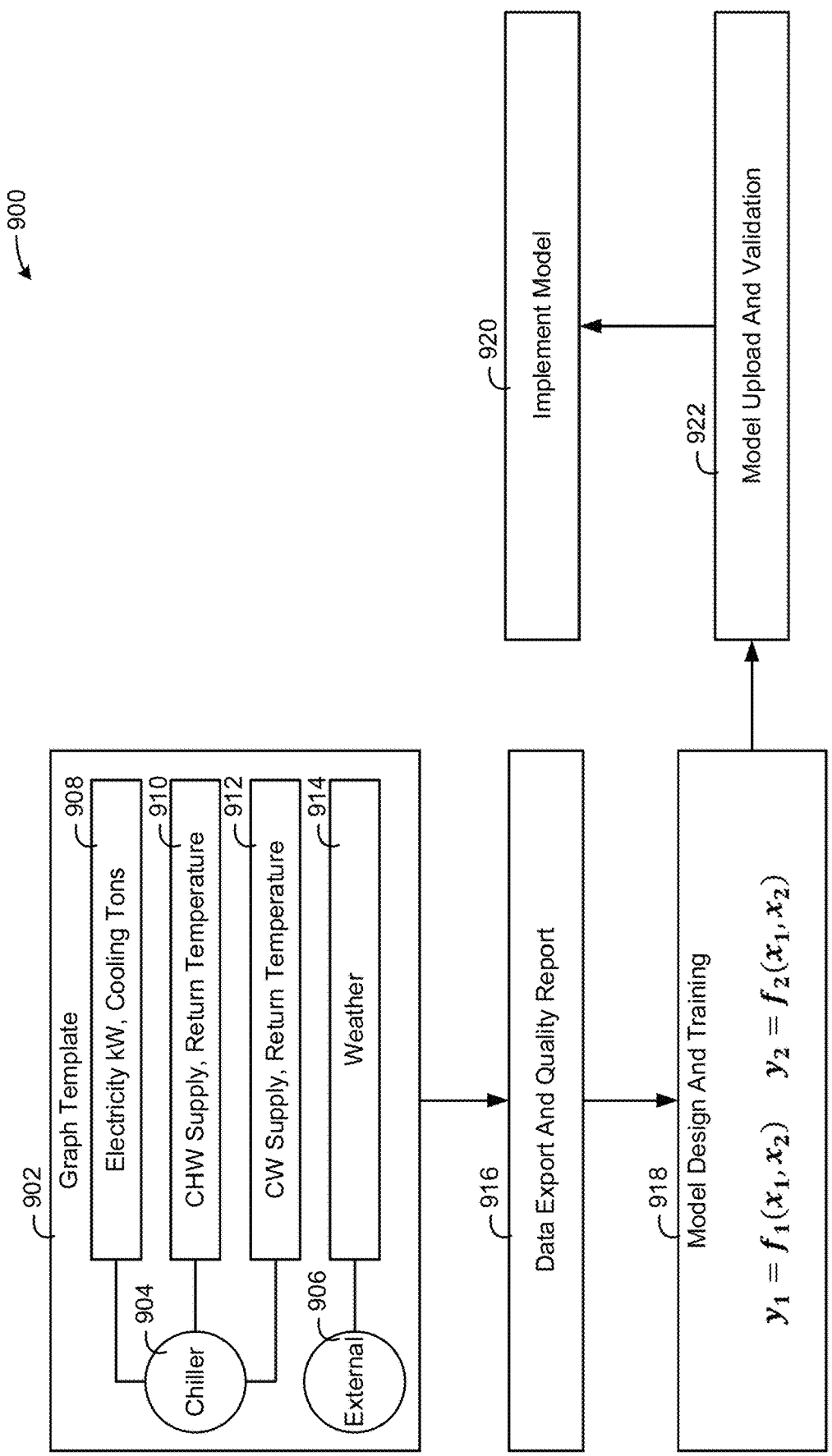
FIG. 9 is a block diagram of a process of using a graph template to query a building graph and identify data for designing, training, and implementing an AI and/or ML model, according to an exemplary embodiment.

Referring now to FIG. 9, a process 900 of using a graph template 902 to query a building graph 614 and identify data for designing, training, and/or implementing an AI and/or ML model is shown, according to an exemplary embodiment. In FIG. 9, the graph template 902 defines a data selection of the building graph 614 for building a chiller efficiency monitoring application based on an AI and/or ML model. The graph template 902 may be similar to the graph template discussed in FIG. 8. A user may define the template 902 to select data for building a model that compares chiller kW/ton efficiency against historical data and weather conditions and identify data outliers. The application can present the data outliers in a dashboard for user attention. In some embodiments, a user device 176 creates the graph template 902 via the development platform 600.

In some embodiments, before (or in parallel) with designing the chiller efficiency application, the user can define the graph template 902. The graph template 902 can allow a user to select what data they wish to view when building their AI and/or ML model and/or application. In FIG. 9, the graph template 902 defines a chiller via chiller node 904 indicating that the user wishes to view chiller data. The chiller node 904 is linked via edges to nodes 908-912 representing electricity in kW consumed by the chiller, cooling tons for the chiller, chilled water (CHW) supply and/or return temperature, condenser water (CW) supply and/or return temperature, etc. The nodes 908-912 can represent points of event data, timeseries data, etc.

The graph template 902 further indicates an external node 906 indicating that the user wishes to view external data from the building. The external node 906 is connected to a weather node 914 via an edge. The weather node 914 may represent outdoor air temperature, outdoor humidity, rain, snow, etc. The node 914 can represent points of event data, timeseries data, etc.

In step 916, the development platform 600 can select and export data from the building graph 614 based on the graph template 902. Furthermore, the development platform 600 can export a quality report for each data point selected from the building graph 614. In some embodiments, the development platform 600 can return one or multiple different data sets that each match the template 902. For example, the each data set could be a data set for a specific chiller and associated external weather source.

In step 918, the development platform 600 can, in some embodiments, allow a user to design an AI and/or ML model based on the various data sets returned in the step 916. The model can receive one or more input variables, e.g., $x_1$, $x_2$, etc. The input variables can be the electricity, the cooling tons, the CHW supply and/or return template, the CW supply and/or return temperature, the weather data, etc. The output of each model can be represented as y, e.g., $y_1$, $y_2$, etc. The output may be the result of a comparison of the chiller efficiency against the historical trend and/or an indication of whether any efficiency anomalies.

In some embodiments, the models designed and trained may be template models that a user can select from. In some embodiments, the models can be developed offline with the data of the step 916 downloaded offline. In some embodiments, the models could be developed in the cloud with direct access to the data selected in the step 916. For example, a virtual machine could allow a user to design a model and train and/or test the model based on the selected data.

In some embodiments, if the models are trained offline, in step 922, the model can be uploaded to the development platform 600 for validation. In some embodiments, the user uploads the model to the development platform 600 once the data science is happy with the trained model and/or analytics pipeline. If the model is generated online, the models can further be validated by the development platform 600. In some embodiments, the development platform 600 uses validation data to validate the models and, if the models perform well enough, can implement the model in step 920. If the performance is not above a particular level, the user may adjust the model design to improve the performance of the model to meet the level required for deployment.

In step 920, the validated model can be deployed to run against the building. The validated model can be deployed as part of an agent as discussed in FIG. 5. The model can further run against data as data is added to the building graph 529. The development platform 600 can, in some embodiments, automatically select and serve high performing models. In some embodiments, the analytic output of the model running can be stored in the building graph 614. In some embodiments, the analytic outputs can be made available to a consuming user or application via a web endpoint. In some embodiments, the values can be displayed in a dashboard for a building and/or entity associated with one or more buildings.

Referring generally to FIGS. 10-13, user interfaces 1000-1300 are shown for generating an AI/ML analytics model, according to various exemplary embodiments. The user interfaces 1000-1300 may be displayed on the user device 176. In some embodiments, the development platform 600 can cause the user device 176 to display the user interfaces 1000-1300 and create an AI/ML project based on the user input to element 1002 via the user interfaces 1000-1300.

Figure 10:
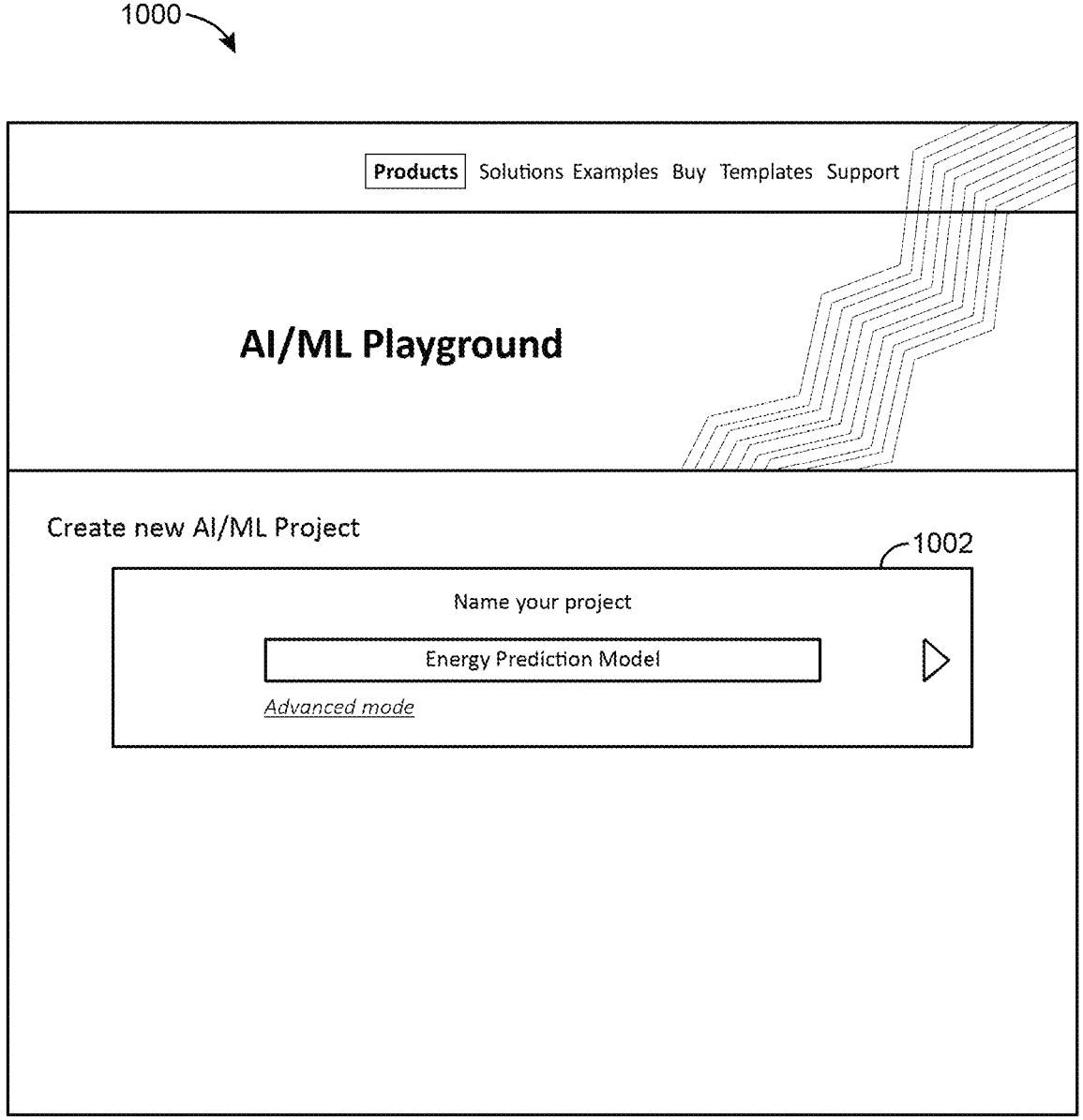
FIG. 10 is a user interface where a user creates a new AI/ML project, according to an exemplary embodiment.

In FIG. 10, the user interface 1000 allows for the user creation a new AI/ML project. In some embodiments, the development platform 600 can cause the user device 176 to display the user interface 1000 and allow a user to create a new project based on user input to element 1002 via the user interface 1000. In FIG. 11, the user interface 1100 is shown where a user selects data sources that generate data to be used in the AI/ML project. The user interface 1100 can be displayed responsive to the user creating a new project via the user interface 1000. In the interface 1100, the user can select data sources by selecting which building portfolio to select data from via an element 1102, select which subsystems to select data from via an element 1104, and select external datasets and simulated data via an element 1108. The user can further select the outcome portfolio to save the result of the project in, in element 1106.

In FIG. 12, a user interface 1200 where a user selects a format for reviewing and selecting data points for the AI/ML project is shown. A user can select either a building graph element 1202 or a subsystem list element 1204. Selecting the building graph element 1202 can allow a user to generate a graph template for querying the building graph 614, e.g., as shown in FIGS. 8-9. Selecting the subsystem list 1204 can allow a user to manually select individual data points for selection. In FIG. 13, a user interface 1300 where a user designs and/or modifies an AI and/or ML model for the AI/ML project is shown. In some embodiments, a user can define the code for an application, AI model, and/or ML model in an element 1302 of the user interface 1300.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

What is claimed:

1. A building system of one or more buildings comprising one or more storage devices storing instructions thereon that, when executed by one or more processors, cause the one or more processors to:
  receive query data from a user device of a user to identify building data to train an analytics model with;
  query, using the query data, a digital twin of the one or more buildings, the digital twin including a plurality of entities including buildings, equipment, spaces, or data of the one or more buildings, the equipment, or the spaces, the digital twin including relationships between the plurality of entities;

receive the building data from the digital twin responsive to querying the digital twin based on the query data received from the user device;

generate the analytics model based on the building data, wherein the analytics model is trained based on the building data; and deploy the analytics model to operate based on data of the one or more buildings and generate one or more analytic results based on the data of the one or more buildings.

2. The building system of claim 1, wherein the instructions cause the one or more processors to:

identify that a requested data point is not included within the digital twin; and perform at least one of:
identifying a substitute data point of the digital twin that substitutes for the requested data point in response to identifying that the requested data point is not included within the digital twin; or simulating the requested data point using data of the digital twin in response to identifying that the requested data point is not included within the digital twin.

3. The building system of claim 1, wherein the instructions cause the one or more processors to:

store a plurality of analytic model templates in the one or more storage devices; and receive, via the user device, a selection of one analytic model template from the plurality of analytic model templates for the analytics model.

4. The building system of claim 1, wherein the instructions cause the one or more processors to:

receive a first hardware or resource selection and a second hardware or resource selection for the analytics model;

test the analytics model with the first hardware or resource selection and the analytics model with the second hardware or resource selection; and generate a first performance score for the analytics model for the first hardware or resource selection and a second performance score for the analytics model for the second hardware or resource selection.

5. The building system of claim 1, wherein the instructions cause the one or more processors to:

receive a first model configuration and a second model configuration for the analytics model;

generate a first analytics model based on the first model configuration and a second analytics model based on the second model configuration; and test the first analytics model and the second analytics model based on at least a portion of the building data and generate a first performance score for the first analytics model and a second performance score for the second analytics model.

6. The building system of claim 5, wherein the instructions cause the one or more processors to:

receive, via a user interface, one or more first configuration parameters for the first model configuration from the user device; and receive, via the user interface, one or more second configuration parameters for the second model configuration from the user device.

7. The building system of claim 1, wherein the instructions cause the one or more processors to:

provide a user interface to the user device, the user interface including a model development environment; and receive a design for the analytics model via the user interface.

8. The building system of claim 7, wherein the instructions cause the one or more processors to receive the design for the analytics model via the user interface by:

providing indications of one or more template analytics models to the user via the user interface; and receiving, via the user interface, a selection of one template analytics model from the one or more template analytics models.

9. The building system of claim 7, wherein the instructions cause the one or more processors to receive the design for the analytics model via the user interface by:

receiving, via the user interface, indications of one or more input data points of the building data for the analytics model; and receiving, via the user interface, indications of one or more output data points of the building data for the analytics model.

10. The building system of claim 7, wherein the instructions cause the one or more processors to receive the design for the analytics model via the user interface by:

causing the user interface to include a code based design interface for designing the analytics model; and receiving, via the user interface, one or more inputs via the code based design interface that designs the analytics model.

11. The building system of claim 1, wherein the digital twin includes a building graph including a plurality of nodes and a plurality of edges;

wherein the plurality of nodes represent the plurality of entities and the plurality of edges represent the relationships between the plurality of entities.

12. The building system of claim 11, wherein the instructions cause the one or more processors to:

receive a graph template via the user device, the graph template defining one or more particular nodes and one or more particular edges connecting the one or more particular nodes; and query the building graph based on the graph template, a result of the query identifying one or more data sets of data matching the graph template.

13. The building system of claim 12, wherein the instructions cause the one or more processors to:

display the graph template in a user interface, wherein each node of the one or more particular nodes is included on one level of a hierarchy; and cause the user interface to display indications of data of the building graph for each level of the hierarchy, the indications indicating data of the building graph that matches a node of a level of the hierarchy and nodes and edges of one or more higher levels of the hierarchy.

14. The building system of claim 13, wherein the data of the building graph includes actual data for the node of the level, substitute data that substitutes for the actual data, or simulated data that is generated to simulate the actual data.

15. A method, comprising:

receiving, by one or more processing circuits, query data from a user device of a user to identify building data to train an analytics model with;

query, by the one or more processing circuits using the query data, a digital twin of one or more buildings, the digital twin including a plurality of entities including buildings, equipment, spaces, or data of the one or more buildings, the equipment, or the spaces, the digital twin including relationships between the plurality of entities;

receiving, by the one or more processing circuits, the building data from the digital twin responsive to querying the digital twin based on the query data received from the user device;

generate the analytics model based on the building data, wherein the analytics model is trained based on the building data; and deploy the analytics model to operate based on data of the one or more buildings and generate one or more analytic results based on the data of the one or more buildings.

16. The method of claim 15, comprising:

identifying, by the one or more processing circuits, that a requested data point is not included within the digital twin; and performing, by the one or more processing circuits, at least one of:
- identifying a substitute data point of the digital twin that substitutes for the requested data point in response to identifying that the requested data point is not included within the digital twin; or
- simulating the requested data point using data of the digital twin in response to identifying that the requested data point is not included within the digital twin.

17. The method of claim 15, wherein the digital twin includes a building graph including a plurality of nodes and a plurality of edges;

wherein the plurality of nodes represent the plurality of entities and the plurality of edges represent the relationships between the plurality of entities.

18. The method of claim 17, comprising:

receiving, by the one or more processing circuits, a graph template via the user device, the graph template defining one or more particular nodes and one or more particular edges connecting the one or more particular nodes; and querying, by the one or more processing circuits, the building graph based on the graph template, a result of the query identifying one or more data sets of data matching the graph template.

19. The method of claim 18, comprising:

displaying, by the one or more processing circuits, the graph template in a user interface, wherein each node of the one or more particular nodes is included on one level of a hierarchy; and causing, by the one or more processing circuits, the user interface to display indications of data of the building graph for each level of the hierarchy, the indications indicating data of the building graph that matches a node of a level of the hierarchy and nodes and edges of one or more higher levels of the hierarchy.

20. One or more storage media storing instructions thereon that, when executed by one or more processors, cause the one or more processors to:

receive query data from a user device of a user to identify building data to train an analytics model with;

query, using the query data, a digital twin of one or more buildings, the digital twin including a plurality of entities including buildings, equipment, spaces, or data of the one or more buildings, the equipment, or the spaces, the digital twin including relationships between the plurality of entities;

receive the building data from the digital twin responsive to querying the digital twin based on the query data received from the user device;

generate the analytics model based on the building data, wherein the analytics model is trained based on the building data; and deploy the analytics model to operate based on data of the one or more buildings and generate one or more analytic results based on the data of the one or more buildings.

\* \* \* \* \*